US012561592B2

(12) United States Patent
Griffin et al.

(10) Patent No.: US 12,561,592 B2
(45) Date of Patent: Feb. 24, 2026

(54) MIGRATING CONTAINER-BASED QUANTUM PROCESSES TO QUANTUM ISOLATION ZONES (QIZs)

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1066 days.

(21) Appl. No.: 17/586,457

(22) Filed: Jan. 27, 2022

(65) Prior Publication Data

US 2023/0244971 A1    Aug. 3, 2023

(51) Int. Cl.
| | |
|---|---|
| *G06N 10/20* | (2022.01) |
| *G06N 10/00* | (2022.01) |
| *G06N 10/80* | (2022.01) |

(52) U.S. Cl.
CPC ............. *G06N 10/20* (2022.01); *G06N 10/00* (2019.01); *G06N 10/80* (2022.01)

(58) Field of Classification Search
CPC ......... G06N 10/20; G06N 10/80; G06N 10/00
See application file for complete search history.

(56) References Cited

U.S. PATENT DOCUMENTS

| | | | |
|---|---|---|---|
| 10,565,514 | B2 | 2/2020 | La Cour et al. |
| 2019/0042970 | A1 | 2/2019 | Zou et al. |
| 2020/0250566 | A1 | 8/2020 | Majumdar |
| 2021/0133619 | A1 | 5/2021 | Brianski et al. |

FOREIGN PATENT DOCUMENTS

| | | |
|---|---|---|
| CN | 112308194 A | 2/2021 |

OTHER PUBLICATIONS

Carrascal, G. et al., "Comparison of container-based platforms for quantum computing simulation," Proceedings of the 2020 Summer Simulation Conference (SummerSim '20), Article 14, Jul. 2020, ACM, 14 pages.

Patel, Y. et al., "Migrating from Classical Machine Learning to Quantum Machine Learning: An overview and case study on Drug Discovery," Oct. 2019, https://www.researchgate.net/profile/Yash-Patel-25/publication/344773718_Migrating_from_Classical_Machine_Learning_to_Quantum_Machine_Learning_An_overview_and_case_study_on_Drug_Discovery/links/5f8ef3d9458515b7cf8e0c7f/Migrating-from-Classical-Machine-Learning-to-Quantum-Machine-Learning-An-overview-and-case-study-on-Drug-Discovery.pdf, 7 pages.

Perez-Castillo, R. et al., "Reengineering of Information Systems toward Classical-Quantum Systems," International Workshop on QuANtum SoftWare Engineering & pRogramming (QANSWER2020), Feb. 11-12, 2020, Talavera de la Reina, Spain, http://ceur-ws.org/Vol-2561/paper7.pdf, 7 pages.

*Primary Examiner* — Peng Ke

(74) *Attorney, Agent, or Firm* — Dority & Manning, P.A.

(57) ABSTRACT

Migrating container-based quantum processes to quantum isolation zones (QIZs) is disclosed herein. In one example, a processor device of a quantum computing device receives a container specification file comprising an indication of a process definition file of a quantum process and an indication of an execution requirement of the quantum process. The processor device determines, based on the execution requirement, that a QIZ provided by the quantum computing device satisfies the execution requirement of the quantum process, wherein the QIZ limits qubit visibility of any quantum process associated with the QIZ to qubits associated with the QIZ. In response to the determining, the processor device allocates one or more qubits of a plurality of qubits associated with the QIZ to the quantum process based on the process definition file, and initiates execution of the quantum process to utilize the one or more qubits, based on the process definition file.

20 Claims, 19 Drawing Sheets

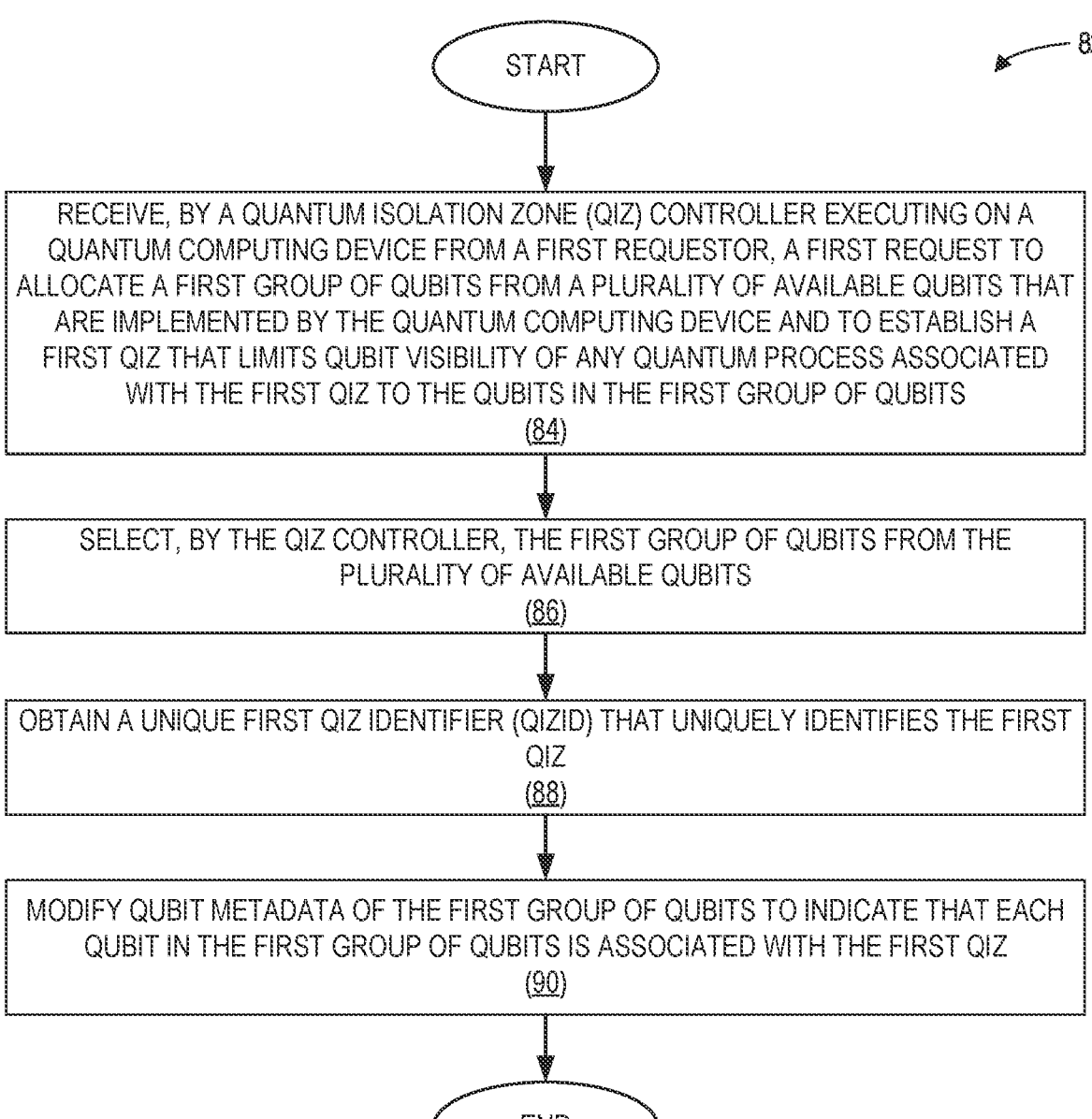

START

RECEIVE, BY A QUANTUM ISOLATION ZONE (QIZ) CONTROLLER EXECUTING ON A QUANTUM COMPUTING DEVICE FROM A FIRST REQUESTOR, A FIRST REQUEST TO ALLOCATE A FIRST GROUP OF QUBITS FROM A PLURALITY OF AVAILABLE QUBITS THAT ARE IMPLEMENTED BY THE QUANTUM COMPUTING DEVICE AND TO ESTABLISH A FIRST QIZ THAT LIMITS QUBIT VISIBILITY OF ANY QUANTUM PROCESS ASSOCIATED WITH THE FIRST QIZ TO THE QUBITS IN THE FIRST GROUP OF QUBITS
(84)

SELECT, BY THE QIZ CONTROLLER, THE FIRST GROUP OF QUBITS FROM THE PLURALITY OF AVAILABLE QUBITS
(86)

OBTAIN A UNIQUE FIRST QIZ IDENTIFIER (QIZID) THAT UNIQUELY IDENTIFIES THE FIRST QIZ
(88)

MODIFY QUBIT METADATA OF THE FIRST GROUP OF QUBITS TO INDICATE THAT EACH QUBIT IN THE FIRST GROUP OF QUBITS IS ASSOCIATED WITH THE FIRST QIZ
(90)

END

*FIG. 2*

START

RECEIVE, BY A QUANTUM COMPUTING DEVICE, A FIRST CONTAINER SPECIFICATION FILE COMPRISING: AN INDICATION OF A FIRST PROCESS DEFINITION FILE OF A FIRST QUANTUM PROCESS; AND AN INDICATION OF A FIRST EXECUTION REQUIREMENT OF THE FIRST QUANTUM PROCESS
116

DETERMINE, BASED ON THE FIRST EXECUTION REQUIREMENT, THAT A FIRST QUANTUM ISOLATION ZONE (QIZ) PROVIDED BY THE QUANTUM COMPUTING DEVICE SATISFIES THE FIRST EXECUTION REQUIREMENT OF THE FIRST QUANTUM PROCESS, WHEREIN THE FIRST QIZ LIMITS QUBIT VISIBILITY OF ANY QUANTUM PROCESS ASSOCIATED WITH THE FIRST QIZ TO A PLURALITY OF QUBITS ASSOCIATED WITH THE FIRST QIZ
118

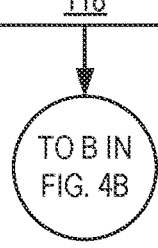

B

—114

RESPONSIVE TO DETERMINING THAT THE FIRST QIZ SATISFIES THE FIRST EXECUTION REQUIREMENT:
120

ALLOCATE A FIRST ONE OR MORE QUBITS OF THE PLURALITY OF QUBITS ASSOCIATED WITH THE FIRST QIZ TO THE FIRST QUANTUM PROCESS BASED ON THE FIRST PROCESS DEFINITION FILE
122

PARSE THE FIRST PROCESS DEFINITION FILE TO DETERMINE A FIRST QUANTITY OF QUBITS NEEDED FOR EXECUTION OF THE FIRST PROCESS DEFINITION FILE
124

BASED ON THE FIRST QUANTITY OF QUBITS, MODIFY QUBIT METADATA OF THE FIRST ONE OR MORE QUBITS TO INDICATE THAT EACH QUBIT IN THE FIRST ONE OR MORE QUBITS IS ALLOCATED TO THE FIRST QUANTUM PROCESS
126

INITIATE EXECUTION OF THE FIRST QUANTUM PROCESS TO UTILIZE THE FIRST ONE OR MORE QUBITS, BASED ON THE FIRST PROCESS DEFINITION FILE
128

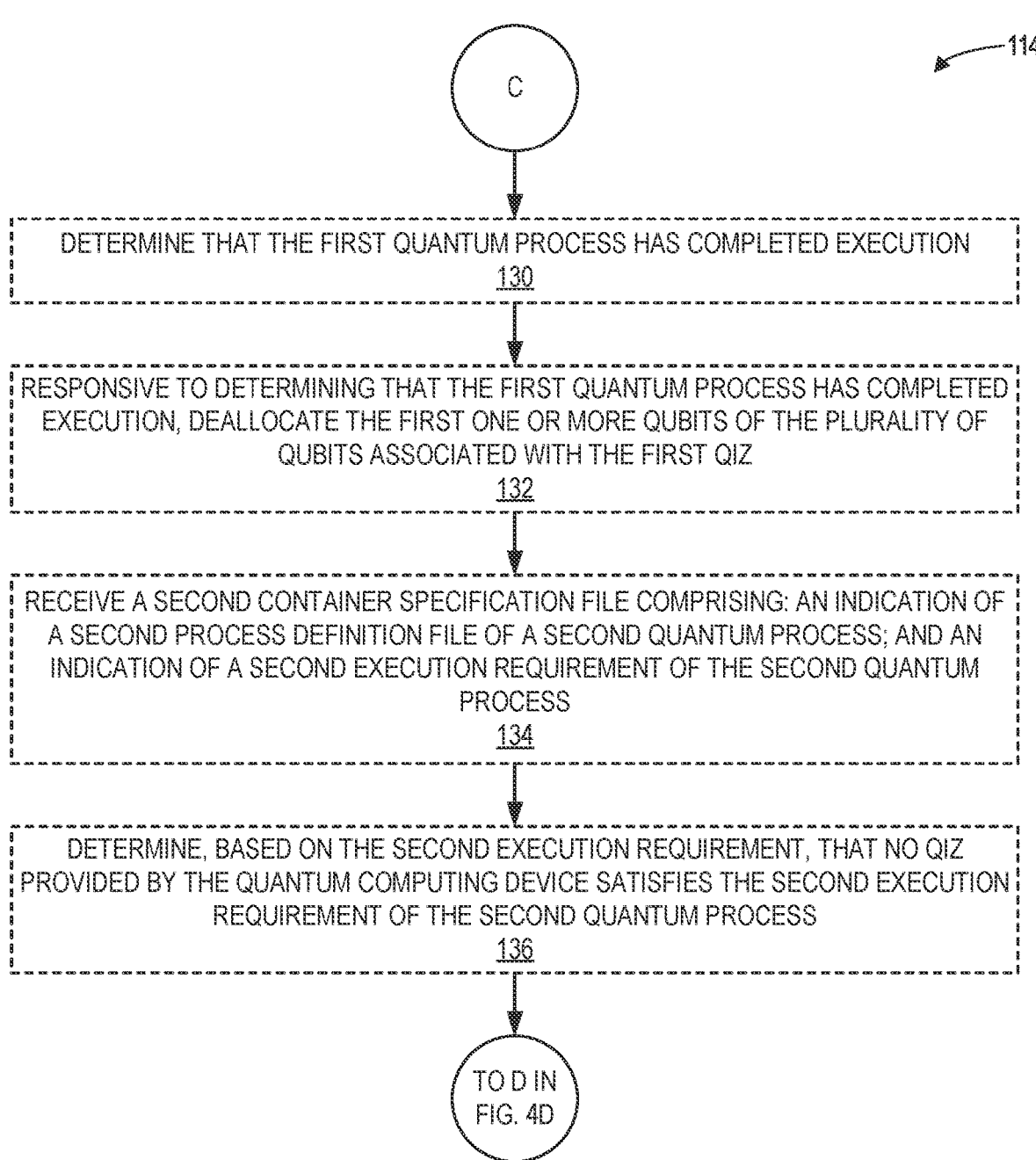

C

DETERMINE THAT THE FIRST QUANTUM PROCESS HAS COMPLETED EXECUTION
130

RESPONSIVE TO DETERMINING THAT THE FIRST QUANTUM PROCESS HAS COMPLETED EXECUTION, DEALLOCATE THE FIRST ONE OR MORE QUBITS OF THE PLURALITY OF QUBITS ASSOCIATED WITH THE FIRST QIZ
132

RECEIVE A SECOND CONTAINER SPECIFICATION FILE COMPRISING: AN INDICATION OF A SECOND PROCESS DEFINITION FILE OF A SECOND QUANTUM PROCESS; AND AN INDICATION OF A SECOND EXECUTION REQUIREMENT OF THE SECOND QUANTUM PROCESS
134

DETERMINE, BASED ON THE SECOND EXECUTION REQUIREMENT, THAT NO QIZ PROVIDED BY THE QUANTUM COMPUTING DEVICE SATISFIES THE SECOND EXECUTION REQUIREMENT OF THE SECOND QUANTUM PROCESS
136

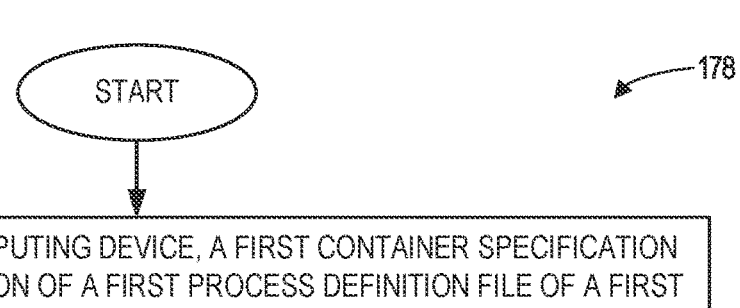

START

RECEIVE, BY A QUANTUM COMPUTING DEVICE, A FIRST CONTAINER SPECIFICATION FILE COMPRISING: AN INDICATION OF A FIRST PROCESS DEFINITION FILE OF A FIRST QUANTUM PROCESS; AND AN INDICATION OF A FIRST EXECUTION REQUIREMENT OF THE FIRST QUANTUM PROCESS
180

DETERMINE, BASED ON THE FIRST EXECUTION REQUIREMENT, THAT A FIRST QUANTUM ISOLATION ZONE (QIZ) PROVIDED BY THE QUANTUM COMPUTING DEVICE SATISFIES THE FIRST EXECUTION REQUIREMENT OF THE FIRST QUANTUM PROCESS, WHEREIN THE FIRST QIZ LIMITS QUBIT VISIBILITY OF ANY QUANTUM PROCESS ASSOCIATED WITH THE FIRST QIZ TO A PLURALITY OF QUBITS ASSOCIATED WITH THE FIRST QIZ
182

RESPONSIVE TO DETERMINING THAT THE FIRST QIZ SATISFIES THE FIRST EXECUTION REQUIREMENT:
184

ALLOCATE A FIRST ONE OR MORE QUBITS OF THE PLURALITY OF QUBITS ASSOCIATED WITH THE FIRST QIZ TO THE FIRST QUANTUM PROCESS BASED ON THE FIRST PROCESS DEFINITION FILE
186

INITIATE EXECUTION OF THE FIRST QUANTUM PROCESS TO UTILIZE THE FIRST ONE OR MORE QUBITS, BASED ON THE FIRST PROCESS DEFINITION FILE
188

END

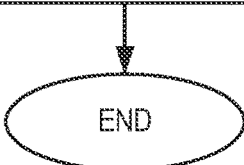

*FIG. 6*

MIGRATING CONTAINER-BASED QUANTUM PROCESSES TO QUANTUM ISOLATION ZONES (QIZs)

BACKGROUND

Quantum computing involves the use of quantum bits, referred to herein as "qubits," which have characteristics that differ from those of classical (i.e., non-quantum) bits used in classical computing. Qubits may be employed by quantum processes that are executed by quantum computing devices to provide desired functionality. As quantum computing continues to increase in popularity and become more commonplace, functionality for programmatically coordinating access to qubits will be desirable.

SUMMARY

The examples disclosed herein migrate container-based quantum processes to quantum isolation zones (QIZs) in quantum computing devices. In one example, a quantum computing device receives a container specification file and, based on a process definition file of a quantum process and an execution requirement of the quantum process indicated by the container specification file, allocates one or more qubits of the QIZ to the quantum process, and executes the quantum process to utilize the one or more qubits of the QIZ.

In another example, a method for migrating container-based quantum processes to QIZs is disclosed. The method comprises receiving, by a quantum computing device, a first container specification file comprising an indication of a first process definition file of a first quantum process, and an indication of a first execution requirement of the first quantum process. The method further comprises determining, based on the first execution requirement, that a first QIZ provided by the quantum computing device satisfies the first execution requirement of the first quantum process, wherein the first QIZ limits qubit visibility of any quantum process associated with the first QIZ to a plurality of qubits associated with the first QIZ. The method also comprises, responsive to determining that the first QIZ satisfies the first execution requirement, allocating a first one or more qubits of the plurality of qubits associated with the first QIZ to the first quantum process based on the first process definition file. The method additionally comprises initiating execution of the first quantum process to utilize the first one or more qubits, based on the first process definition file.

In another example, a quantum computing device for migrating container-based quantum processes to QIZs is disclosed. The quantum computing device comprises a system memory, and a processor device communicatively coupled to the system memory. The processor device is to receive a first container specification file comprising an indication of a first process definition file of a first quantum process, and an indication of a first execution requirement of the first quantum process. The processor device is further to determine, based on the first execution requirement, that a first QIZ provided by the quantum computing device satisfies the first execution requirement of the first quantum process, wherein the first QIZ limits qubit visibility of any quantum process associated with the first QIZ to a plurality of qubits associated with the first QIZ. The processor device is also to, responsive to determining that the first QIZ satisfies the first execution requirement, allocate a first one or more qubits of the plurality of qubits associated with the first QIZ to the first quantum process based on the first process definition file. The processor device is additionally to initiate execution of the first quantum process to utilize the first one or more qubits, based on the first process definition file.

In another example, a non-transitory computer-readable medium for migrating container-based quantum processes to QIZs is disclosed. The non-transitory computer-readable medium stores thereon computer-executable instructions that, when executed, cause one or more processor devices to receive a first container specification file comprising an indication of a first process definition file of a first quantum process, and an indication of a first execution requirement of the first quantum process. The computer-executable instructions further cause the one or more processor devices to determine, based on the first execution requirement, that a first QIZ provided by a quantum computing device satisfies the first execution requirement of the first quantum process, wherein the first QIZ limits qubit visibility of any quantum process associated with the first QIZ to a plurality of qubits associated with the first QIZ. The computer-executable instructions also cause the one or more processor devices to, responsive to determining that the first QIZ satisfies the first execution requirement, allocate a first one or more qubits of the plurality of qubits associated with the first QIZ to the first quantum process based on the first process definition file. The computer-executable instructions additionally cause the one or more processor devices to initiate execution of the first quantum process to utilize the first one or more qubits, based on the first process definition file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a flowchart of a method for implementing QIZs according to one example;

FIGS. 4A-4E are flowcharts illustrating operations performed by the quantum computing system of FIGS. 3A-3D for migrating container-based quantum processes to QIZs, according to one example;

FIG. 6 is a flowchart of a simplified method for migrating container-based quantum processes to QIZs by the quantum computing device of FIG. 5, according to one example.

DETAILED DESCRIPTION

Figure 1A:
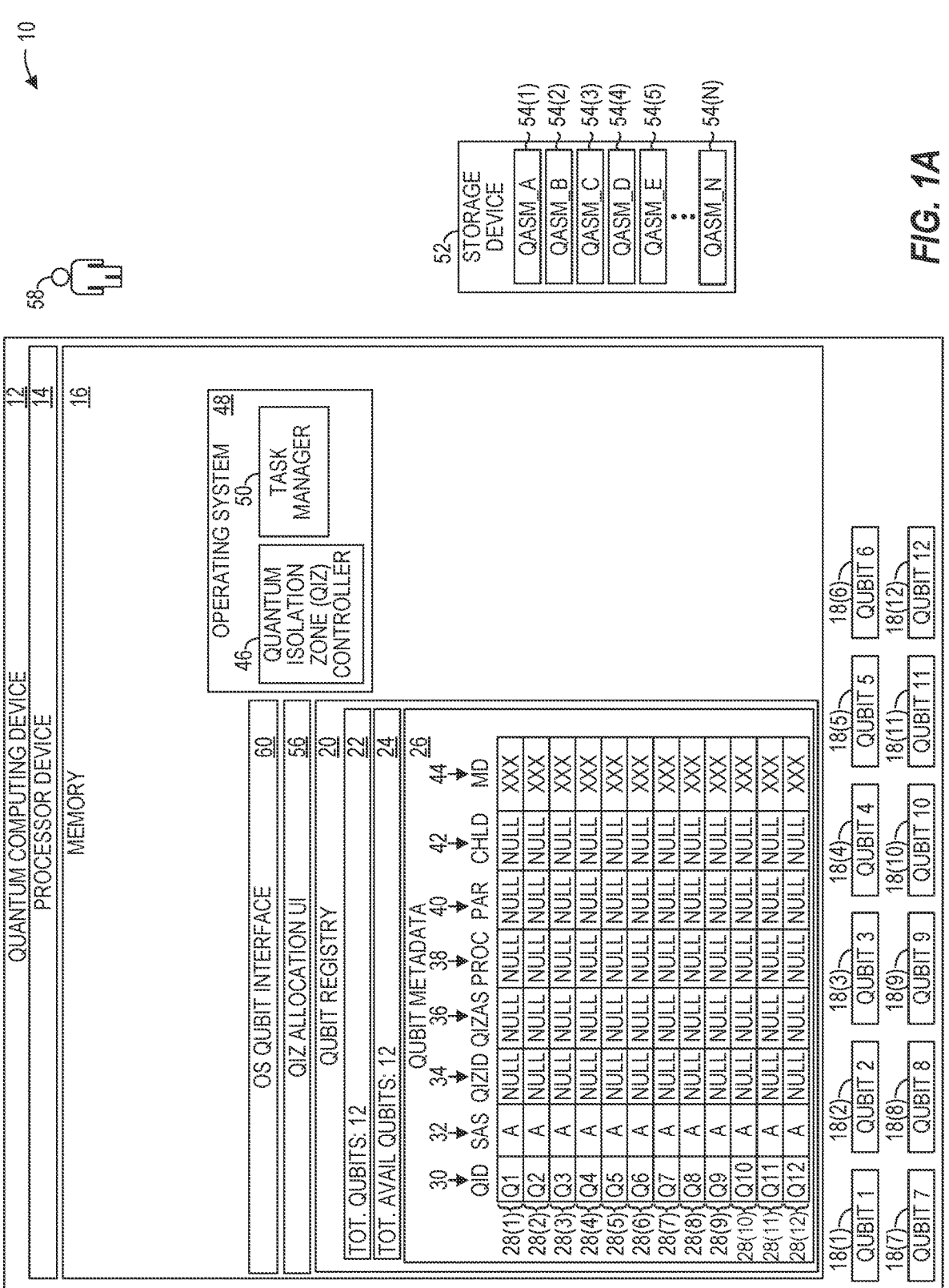
FIGS. 1A-1F are block diagrams of an environment, at successive points in time, in which quantum isolation zones (QIZs) can be implemented according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources, but as the technology evolves, quantum computing systems are implementing larger and larger numbers of qubits. As quantum computing continues to increase in popularity and become more commonplace, it is increasingly important for the operating system to control access to qubits, for example, to ensure that one quantum process does not inadvertently access a qubit utilized by another quantum process, to ensure that qubits containing private information can only be accessed by quantum processes that should have access to such private information, and to generally isolate one quantum process from another quantum process.

The examples disclosed herein implement quantum isolation zones (QIZs) to ensure a that quantum process can only access qubits allocated to the QIZ in which the quantum process executes, and that the quantum process has no visibility to or ability to access qubits external to the QIZ in which the quantum process executes (e.g., qubits that are allocated to other QIZs or that are otherwise implemented on the quantum computing system). The examples disclosed herein also implement quantum process relationship graphs that facilitate visibility of qubits by a plurality of quantum processes that execute within a QIZ and that have relationships with one another. A first quantum process executing in a QIZ that is not related to a second quantum process executing in the same QIZ has no visibility to the qubits allocated to the second quantum process. Thus, the examples facilitate isolation even within the same QIZ while enabling qubit sharing within the same QIZ among related quantum processes.

Additional examples disclosed herein provide migration of container-based quantum processes to QIZs. In one example, a migration service executing on a quantum computing device receives a first container specification file that comprises an indication of a first process definition file of a first quantum process, and an indication of a first execution requirement of the first quantum process. The migration service determines, based on the first execution requirement, that a first QIZ provided by the quantum computing device satisfies the first execution requirement of the first quantum process. In response, the migration service allocates a first one or more qubits of a plurality of qubits associated with the first QIZ to the first quantum process based on the first process definition file, and initiates execution of the first quantum process to utilize the first one or more qubits, based on the first process definition file. In this manner, a quantum process that was developed within a container provided by a container platform may be migrated into a QIZ for execution on a quantum computing device.

FIGS. 1A-1F are block diagrams of an environment, at successive points in time, in which QIZs can be practiced, according to one example. As seen in FIG. 1A, an environment 10 includes a quantum computing device 12 that operates in a quantum environment, but is capable of operating using classical computing principles or quantum computing principles. When using quantum computing principles, the quantum computing device 12 performs computations that utilize quantum-mechanical phenomena, such as superposition and entanglement. The quantum computing device 12 may operate under certain environmental conditions, such as at or near zero degrees (0°) Kelvin. When using classical computing principles, the quantum computing device 12 utilizes binary digits that have a value of either one (1) or zero (0).

The quantum computing device 12 includes a processor device 14 and a memory 16. The quantum computing device 12 in the example of FIG. 1A implements 12 qubits 18(1)-18(12) (generally referred to herein as "qubits 18"). The quantum computing device 12 includes a qubit registry 20 that maintains information about the qubits 18(1)-18(12), including, by way of non-limiting example, a total qubits counter (captioned "TOT. QUBITS" in FIGS. 1A-1F) 22 that identifies the total number of qubits 18 implemented by the quantum computing device 12, as well as a total available qubits counter (captioned "TOT. AVAIL QUBITS" in FIGS. 1A-1F) 24 that maintains count of the total number of qubits 18 that are currently available for allocation.

The qubit registry 20 also maintains qubit metadata 26, which comprises a plurality of metadata records 28(1)-28(12) (generally referred to herein as "metadata records 28"), each of which maintains information about a corresponding qubit 18(1)-18(12). Each metadata record 28 includes a qubit identifier (QID) 30 that contains an identifier of the qubit 18(1)-18(12) to which the respective metadata record 28 corresponds; a system availability status (SAS) 32 that identifies whether the corresponding qubit 18 is available for allocation at the quantum computing system level; a QIZ identifier (QIZID) 34 that identifies the QIZ, if any, to which the corresponding qubit 18 has been allocated; and a QIZ availability status (QIZAS) 36 that identifies whether the corresponding qubit 18, if allocated to a QIZ, is available in the QIZ or has been allocated to a quantum process executing in the QIZ.

Each metadata record 28 also includes a process identifier (captioned "PROC" in FIGS. 1A-1F) 38 of the quantum process, if any, to which the corresponding qubit 18 has been allocated; a parent identifier (captioned "PAR" in FIGS. 1A-1F) 40 that identifies a parent quantum process, if any, of the quantum process to which the corresponding qubit 18 has been assigned; and a child identifier (captioned "CHLD" in FIGS. 1A-1F) 42 that identifies a child quantum process, if any, of the quantum process to which the corresponding qubit 18 has been assigned. Each metadata record 28 may further include additional metadata (captioned "MD" in FIGS. 1A-1F) 44 that are not relevant to the examples disclosed herein, such as metadata indicating a real-time state of the corresponding qubit 18, metadata indicating whether the qubit 18 is in a state of entanglement or superposition, or the like. While solely for purposes of illustration the quantum computing device 12 is described as having 12 qubits 18, it is to be understood that the quantum computing device 12 may provide more or fewer qubits 18 in some examples.

At a point in time illustrated in FIG. 1A, the qubits 18 are unallocated, and thus the system availability status 32 for each metadata record 28 has a value of "A" to indicate that the corresponding qubit 18 is available. The values of the other fields in the metadata records 28 have a value of "NULL," which may comprise any value that indicates that the corresponding field is empty.

The quantum computing device 12 includes a QIZ controller 46 that, as described in greater detail below, operates to establish QIZs that each allow quantum processes to execute and access qubits 18 allocated to that QIZ, but restrict or deny access to any of the qubits 18 that are allocated to other QIZs. The QIZ controller 46 may be an operating system component (e.g., a kernel module or the like) of an operating system 48. As such, the QIZ controller 46 may run at a ring 0 level of the processor device 14 and thus execute in a kernel mode and a kernel space rather than as a user process in a user space. The quantum computing device 12 also includes a task manager 50 that is configured to initiate a quantum process from a process definition file, such as a quantum assembly language (QASM) file, or the like. In this example, a storage device 52 contains a plurality of QASM files 54(1)-54(N), each of which includes quantum programming instructions that, when executed, implement a desired functionality.

The quantum computing device 12 may further include a QIZ allocation user interface (UI) 56 that allows an operator 58 to interact with the QIZ controller 46 to establish a QIZ. The quantum computing device 12 may also include an operating system (OS) qubit interface 60 that is invoked when a quantum process attempts to read, write, or otherwise query a qubit 18. In some examples, the OS qubit interface 60 may, in turn, communicate with the QIZ controller 46, while some examples may provide that the QIZ controller 46 is integrated with the OS qubit interface 60.

It is assumed in the example of FIGS. 1A-1F that that the QIZ controller 46 receives a request from a requestor to allocate a first group of qubits 18 from available qubits 18 to establish a first QIZ that limits visibility of any quantum process associated with the first QIZ to only the qubits 18 in the first group of qubits 18. The request may identify the number of qubits 18 and, if applicable, other criteria, such as a particular type or other desired characteristic of the qubits 18.

In one example, the requestor may be the QIZ allocation UI 56 which makes the request in response to input from the operator 58. In another example, the request may be a programmatic request from a process executing on the quantum computing device 12 or elsewhere. The request may come directly to the QIZ controller 46, or indirectly via the OS qubit interface 60. In this example, the request indicates that six (6) qubits 18 are to be allocated to the QIZ. The QIZ controller 46 accesses the qubit metadata 26 and identifies six (6) qubits 18 that have a system availability status 32 that indicates the qubits 18 are available. In the example of FIG. 1A, the QIZ controller 46 determines that the qubits 18(1)-18(6) are available based on the system availability status 32 of the metadata records 28(1)-28(6).

Figure 1B:
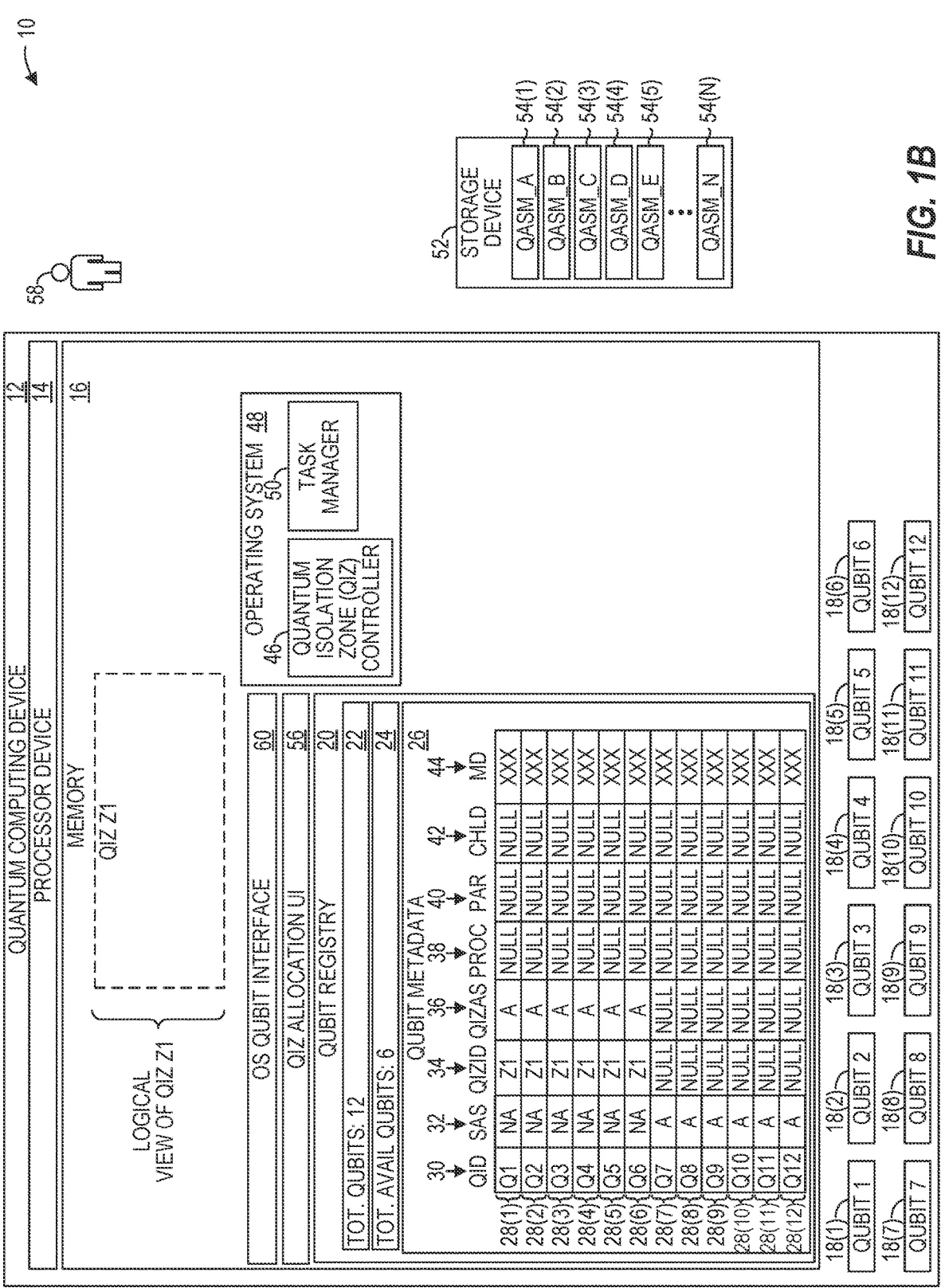

Referring now to FIG. 1B, the QIZ controller 46 modifies the system availability status 32 of the metadata records 28(1)-28(6) with a value of "NA" (i.e., not available) to indicate that the qubits 18(1)-18(6) are no longer available for allocation. The QIZ controller 46 next obtains a unique QIZ identifier (in this example, "Z1"), and modifies the QIZID 34 to indicate that the qubits 18(1)-18(6) have been allocated to the QIZ Z1. Some examples may provide that the QIZ controller 46 generates the unique QIZID, or is provided the unique QIZID by the requestor or via some other mechanism. The QIZ controller 46 then modifies the QIZ availability status 36 to indicate that the qubits 18(1)-18(6) are available for allocation within the QIZ Z1. The QIZ controller 46 modifies the total available qubits counter 24 to indicate that six (6) qubits (i.e., the qubits 18(7)-18(12)) are now available for allocation to a QIZ.

To better facilitate an understanding of the isolation and relationship aspects of QIZs implemented by the examples herein, a logical view of QIZ Z1 is illustrated in dashed lines in FIGS. 1B-1F. However, it is to be understood that the QIZ Z1 illustrated in FIGS. 1B-1F in dashed outline is a logical depiction provided only for ease of understanding, and that the functionality of the QIZ Z1 is implemented via the QIZ controller 46, the qubit metadata 26, and other components as described herein.

For the sake of illustration, it is assumed in FIG. 1B that the task manager 50 receives a request to initiate a quantum process based on the QASM file 54(1) into the QIZ Z1. The request may be received according to a schedule, may be received programmatically, or may be initiated via input from the operator 58. The task manager 50 may access the QASM file 54(1) and parse the QASM file 54(1) to determine that, during execution, a quantum process initiated from the QASM file 54(1) will utilize two (2) of the qubits 18. In other examples, the number of qubits 18 to be allocated to the quantum process may be contained in the request to initiate the quantum process. The task manager 50 sends a request to the QIZ controller 46 for an allocation of two (2) of the qubits 18 from the QIZ Z1. The QIZ controller 46 receives the request to allocate two (2) of the qubits 18 in the QIZ Z1 to a quantum process that is, or will be, associated with the QIZ Z1. Based on the metadata records 28, the QIZ controller 46 determines that the qubits 18(1) and 18(2) are available for allocation within the QIZ Z1.

Figure 1C:
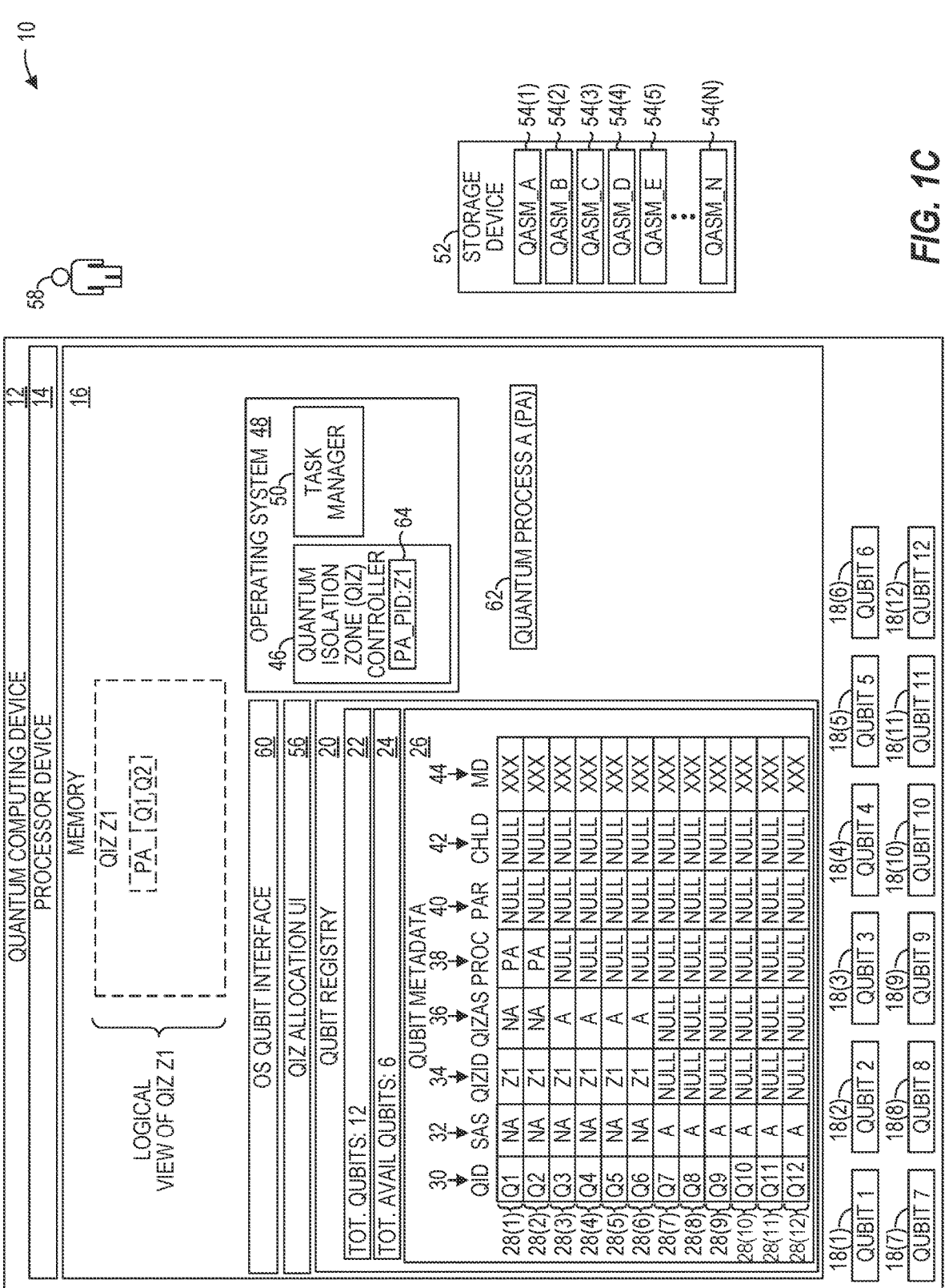

Referring now to FIG. 1C, the QIZ controller 46 modifies the QIZ availability status 36 of the metadata records 28(1) and 28(2) (e.g., by setting the value to "NA") to indicate that the corresponding qubits 18(1) and 18(2) have been allocated, and thus are no longer available for allocation. The QIZ controller 46 provides the qubit IDs of the qubits 18(1) and 18(2) to the task manager 50, which then initiates a quantum process (captioned as "PA" in FIGS. 1C-1F) 62 into the QIZ Z1 with location and/or address information of the qubits 18(1) and 18(2). The task manager 50 provides a unique program ID (PID) of the quantum process 62 (captioned as "PA_PID" in FIGS. 1C-1F) to the QIZ controller 46. The QIZ controller 46 maintains a mapping record 64 that maps the PID to the QIZ Z1. The quantum process 62 is now said to "execute in" or be "associated with" the QIZ Z1, because the visibility of and access to the qubits 18(1)-18(12) by the quantum process 62 is now constrained by the QIZ Z1.

As an example, assume that, at the point in time illustrated in FIG. 1C, the quantum process 62 issues a request to the OS qubit interface 60 to obtain a list of qubit IDs of all qubits 18 to which the quantum process 62 has access (i.e., read access and/or write access) or which are available for allocation. The OS qubit interface 60 communicates with the QIZ controller 46. The QIZ controller 46 determines the PID of the requestor, which in this case is the PID PA_PID, the PID of the quantum process 62. The QIZ controller 46 accesses the mapping record 64 and determines that the quantum process 62 is associated with the QIZ Z1. The QIZ controller 46 accesses the metadata records 28, and determines that the qubits 18(1)-18(6) have been allocated to the QIZ Z1, and that the four (4) qubits 18(3)-18(6) are available. Because the qubits 18(1) and 18(2) have already been allocated to the quantum process 62, and the four qubits 18(3)-18(6) are available, the QIZ controller 46 returns the qubit IDs of the qubits 18(1)-18(6) to the quantum process 62 via the OS qubit interface 60, indicating that the quantum process 62 has access to the qubits 18(1) and 18(2) and that the qubits 18(3)-18(6) are available for allocation. Thus, from the perspective of the quantum process 62, the quantum computing device 12 contains four (4) available qubits 18, and the quantum process 62 is unaware of and unable to access (e.g., is isolated from) the actual additional available qubits 18(7)-18(12).

Assume further that, in response to the information that the qubits 18(3)-18(6) are available, the quantum process 62 issues a request to the OS qubit interface 60 to have an additional qubit 18 allocated to the quantum process 62. The OS qubit interface 60 provides the request to the QIZ controller 46. The QIZ controller 46 then selects one (1) of the qubits 18(3)-18(6), modifies the appropriate metadata record 28 to indicate the qubit 18 is now allocated to the quantum process 62, and returns information to the quantum process 62 identifying the allocated qubit 18. Note that this is merely an example of a potential action that the quantum process 62 may take, and is thus not reflected in the metadata records 28 illustrated in FIG. 1C.

Figure 1D:
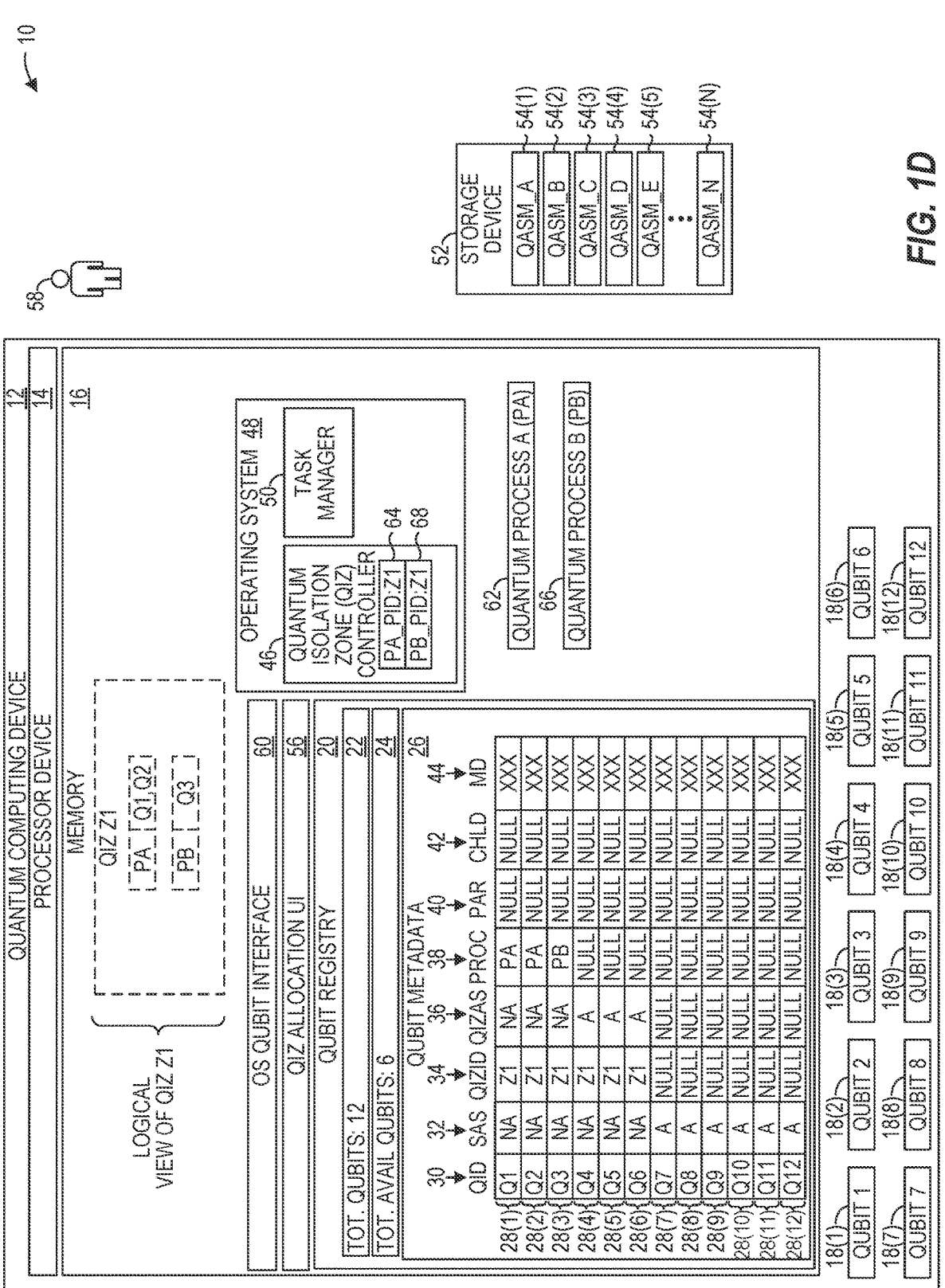

Assume also that the task manager 50 receives a request to initiate a quantum process based on the QASM file 54(2) into the QIZ Z1. The task manager 50 may access the QASM file 54(2) and parse the QASM file 54(2) to determine that, during execution, the quantum process will utilize one (1) qubit 18. The task manager 50 sends a request to the QIZ controller 46 for an allocation of one (1) qubit 18 from the QIZ Z1. The QIZ controller 46 receives the request to allocate one (1) qubit in the QIZ Z1 to a quantum process that is, or will be, associated with the QIZ Z1. Based on the metadata records 28, the QIZ controller 46 determines that the qubit 18(3) is available for allocation within the QIZ Z1. Referring now to FIG. 1D, the QIZ controller 46 modifies the QIZ availability status 36 of the metadata record 28(3) (e.g., by setting the value to "NA") to indicate that the corresponding qubit 18(3) has been allocated and thus is no longer available for allocation.

The QIZ controller 46 provides the qubit ID of the qubit 18(3) to the task manager 50. The task manager 50 initiates a quantum process (captioned as "PB" in FIGS. 1D-1F) 66 into the QIZ Z1 with location information of the qubit 18(3). The task manager 50 provides a unique PID of the quantum process 66 (captioned as "PB_PID" in FIGS. 1D-1F) to the QIZ controller 46. The QIZ controller 46 maintains a mapping record 68 that maps the PID to the QIZ Z1. The quantum process 66 is now said to "execute in" or be "associated with" the QIZ Z1.

Additionally, assume that, at the point in time illustrated in FIG. 1D, subsequent to the allocation of the qubit 18(3) to the quantum process 66, the quantum process 62 issues a request to the OS qubit interface 60 to obtain a list of qubit IDs of all qubits 18 to which the quantum process 62 has access (i.e., read access and/or write access) and which are available for allocation. The OS qubit interface 60 communicates with the QIZ controller 46. The QIZ controller 46 determines the PID of the requestor, which in this case is the PID PA_PID, the PID of the quantum process 62. The QIZ controller 46 accesses the mapping record 64 and determines that the quantum process 62 is associated with the QIZ Z1.

The QIZ controller 46 then accesses the metadata records 28 and determines that the qubits 18(1)-18(6) have been allocated to the QIZ Z1, the qubit 18(3) has been allocated to the quantum process 66, and that the three (3) qubits 18(4)-18(6) are available. Based on the metadata record 28(3), the QIZ controller 46 determines that the quantum process 66 is not related to the quantum process 62 because the parent identifier 40 and the child identifier 42 are NULL, indicating that the quantum process 62 has no parent process or child process at this time. Because the quantum process 62 and the quantum process 66 are unrelated, the quantum process 66 has no visibility to or access to qubits 18 allocated to the quantum process 62, and the quantum process 62 has no visibility to or access to qubits 18 allocated to the quantum process 66.

Because the qubit 18(3) has been allocated to the quantum process 66, and the three (3) qubits 18(4)-18(6) are available, the QIZ controller 46 returns the qubit IDs of the qubits 18(1), 18(2), and 18(4)-18(6) to the quantum process 62 via the OS qubit interface 60, indicating that the quantum process 62 has access to the qubits 18(1) and 18(2), and that the qubits 18(4)-18(6) are available for allocation. The quantum process 62 is thus unaware of the qubit 18(3) or the qubits 18(7)-18(12).

Figure 1E:
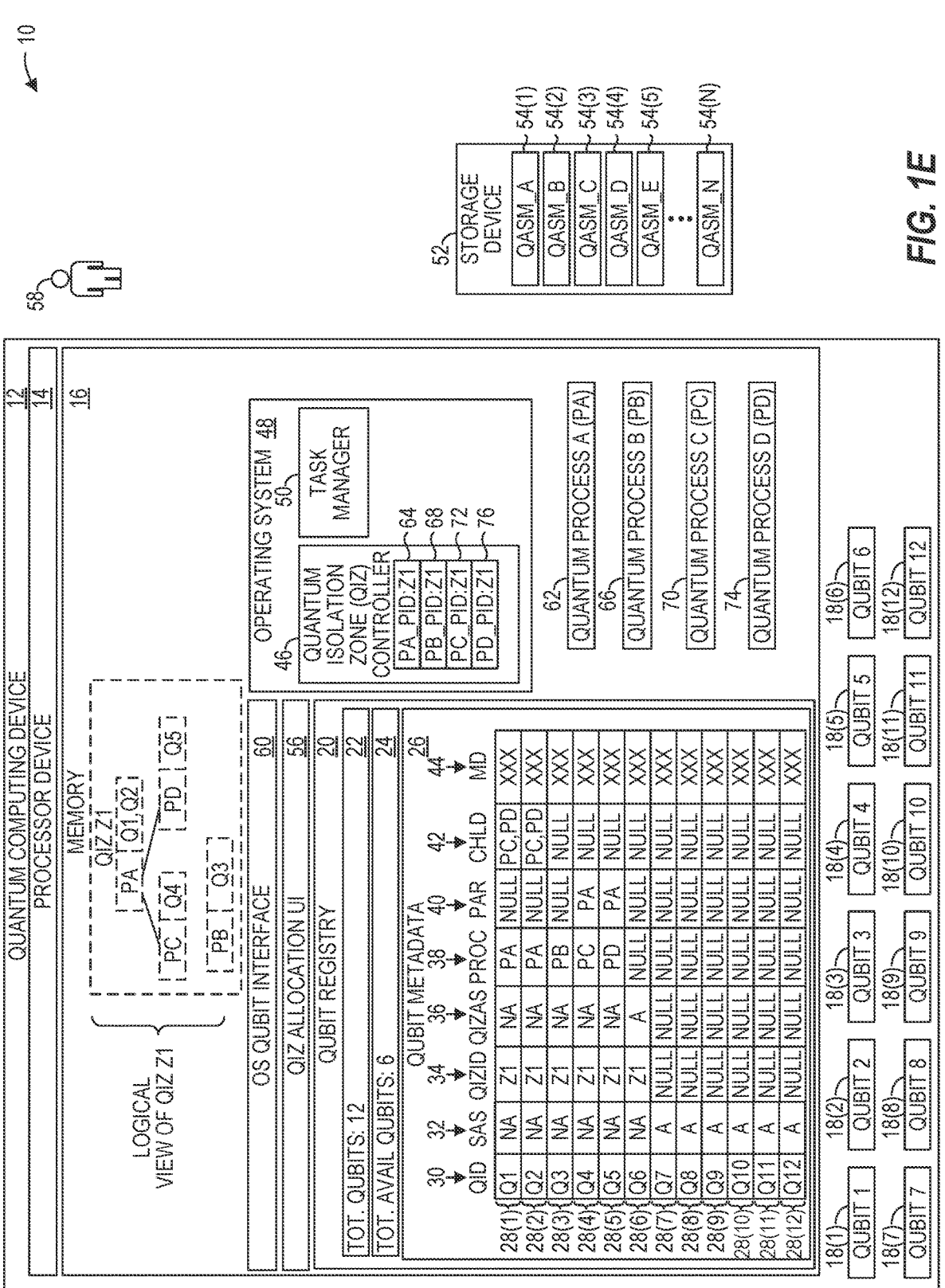

Referring now to FIG. 1E, a QIZ relationship graph that establishes relationships among quantum processes in a QIZ will be discussed. Assume that, in a manner similar to that discussed above with regard to the quantum processes 62 and 66, a quantum process (captioned as "PC" in FIGS. 1E-1F) 70 is initiated from the QASM file 54(3) into the QIZ Z1 and is allocated the qubit 18(4). The QIZ controller 46 generates a mapping record 72 that maps the PID of the quantum process 70 (captioned as "PC_PID" in FIGS. 1E-1F) to the QIZ Z1. However, in this example, the quantum process 70 is identified as a child process of the quantum process 62. The designation may occur in any of several different manners. In one implementation, the task manager 50 may communicate to the QIZ controller 46 that the quantum process 70 is to be designated a child process of the quantum process 62. In another example, the request to initiate the quantum process 70 from the QASM file 54(3), and to allocate a qubit 18 to the quantum process 70, may originate from the quantum process 62. In this example, the act of the quantum process 62 requesting the initiation of the quantum process 70 by itself identifies the parent-child relationship.

The QIZ controller 46 modifies the QIZ availability status 36 of the metadata record 28(4) (e.g., by setting the value to "NA") to indicate that the qubit 18(4) is no longer available for allocation. The QIZ controller 46 also modifies the process identifier 38 of the metadata record 28(4) to indicate that the qubit 18(4) is allocated to the quantum process 70. The QIZ controller 46 additionally modifies the parent identifier 40 of the metadata record 28(4) to indicate that the quantum process 62 is a parent process of the quantum process 70. The QIZ controller 46 also modifies the child identifier 42 of the metadata records 28(1) and 28(2) to indicate that the quantum process 70 is a child process of the quantum process 62.

Assume further that a quantum process (captioned as "PD" in FIGS. 1E-1F) 74 is initiated from the QASM file 54(4) into the QIZ Z1 and allocated the qubit 18(5). The QIZ controller 46 generates a mapping record 76 that maps the PID of the quantum process 74 (captioned as "PD_PID" in FIGS. 1E-1F) to the QIZ Z1. In this example, the quantum process 74 is also identified as a child process of the quantum process 62.

The QIZ controller 46 modifies the QIZ availability status 36 of the metadata record 28(5) (e.g., by setting the value to "NA") to indicate that the qubit 18(5) is no longer available for allocation. The QIZ controller 46 also modifies the process identifier 38 of the metadata record 28(5) to indicate that the qubit 18(5) is allocated to the quantum process 74. The QIZ controller 46 additionally modifies the parent identifier 40 of the metadata record 28(5) to indicate that the quantum process 62 is a parent process of the quantum process 74. The QIZ controller 46 modifies the child identifier 42 of the metadata records 28(1) and 28(2) to indicate that the quantum process 74 is a child process of the quantum process 62.

The metadata records 28(1), 28(2), 28(4) and 28(5) establish a relationship graph that appears, logically, as that illustrated in the logical view of the QIZ Z1 in FIG. 1E, such that the quantum process 62 is the parent process of the child quantum processes 70 and 74. As will be discussed herein, the relationship graph established in the metadata records 28(1), 28(2), 28(4), and 28(5) impacts the visibility of qubits 18 by the quantum processes 62, 66, 70, and 74.

To illustrate the impact of the relationship graph in the QIZ Z1, assume that the quantum process 62 issues a request to the OS qubit interface 60 to obtain a list of qubit IDs of all qubits 18 to which the quantum process 62 has access (i.e., read access and/or write access) or which are available for allocation. The OS qubit interface 60 communicates with the QIZ controller 46. The QIZ controller 46 determines the PID of the requestor, which in this case is the PID PA_PID, the PID of the quantum process 62. The QIZ controller 46 accesses the mapping record 64 and determines that the quantum process 62 is associated with the QIZ Z1. The QIZ controller 46 accesses the metadata records 28 and determines that the qubits 18(1)-18(6) have been allocated to the QIZ Z1, and that the qubit 18(6) is available. The QIZ controller 46 also determines that the qubits 18(1) and 18(2) have been allocated to the quantum process 62. The QIZ controller 46 determines that the quantum process 62 has two (2) child processes executing in the QIZ Z1, the quantum processes 70 and 74. Because the quantum processes 70 and 74 are child processes of the quantum process 62, the quantum process 62 has access to the qubits 18(4) and 18(5) allocated to the quantum processes 70 and 74, respectively. The QIZ controller 46 returns the qubit IDs of the qubits 18(1), 18(2), and 18(4)-18(6), indicating that the quantum process 62 has access to the qubits 18(1), 18(2), 18(4), and 18(5), and that the qubit 18(6) is available for allocation.

Assume next that the quantum process 70 issues a request to the OS qubit interface 60 to obtain a list of qubit IDs of all qubits 18 to which the quantum process 70 has access (i.e., read access and/or write access) or which are available for allocation. The OS qubit interface 60 communicates with the QIZ controller 46. The QIZ controller 46 determines the PID of the requestor, which in this case is the PID PC_PID, the PID of the quantum process 70. The QIZ controller 46 accesses the mapping record 72 and determines that the quantum process 70 is associated with the QIZ Z1. The QIZ controller 46 additionally accesses the metadata records 28 and determines that the qubits 18(1)-18(6) have been allocated to the QIZ Z1, and that the qubit 18(6) is available. The QIZ controller 46 also determines that the qubit 18(4) has been allocated to the quantum process 70. The QIZ controller 46 determines that the quantum process 70 has no child processes executing in the QIZ Z1, and that the quantum process 62 is a parent process of the quantum process 70. Because the quantum process 62 is a parent process of the quantum process 70, the quantum process 70 has access to the qubits 18(1) and 18(2) allocated to the quantum process 62. However, because the quantum process 74 is neither a parent process nor a child process of the quantum process 70, the quantum process 70 has no visibility to the qubit 18(5) allocated to the quantum process 74. The QIZ controller 46 returns the qubit IDs of the qubits 18(1), 18(2), 18(4) and 18(6), indicating that the quantum process 70 has access to the qubits 18(1), 18(2), and 18(4), and that the qubit 18(6) is available for allocation.

Figure 1F:
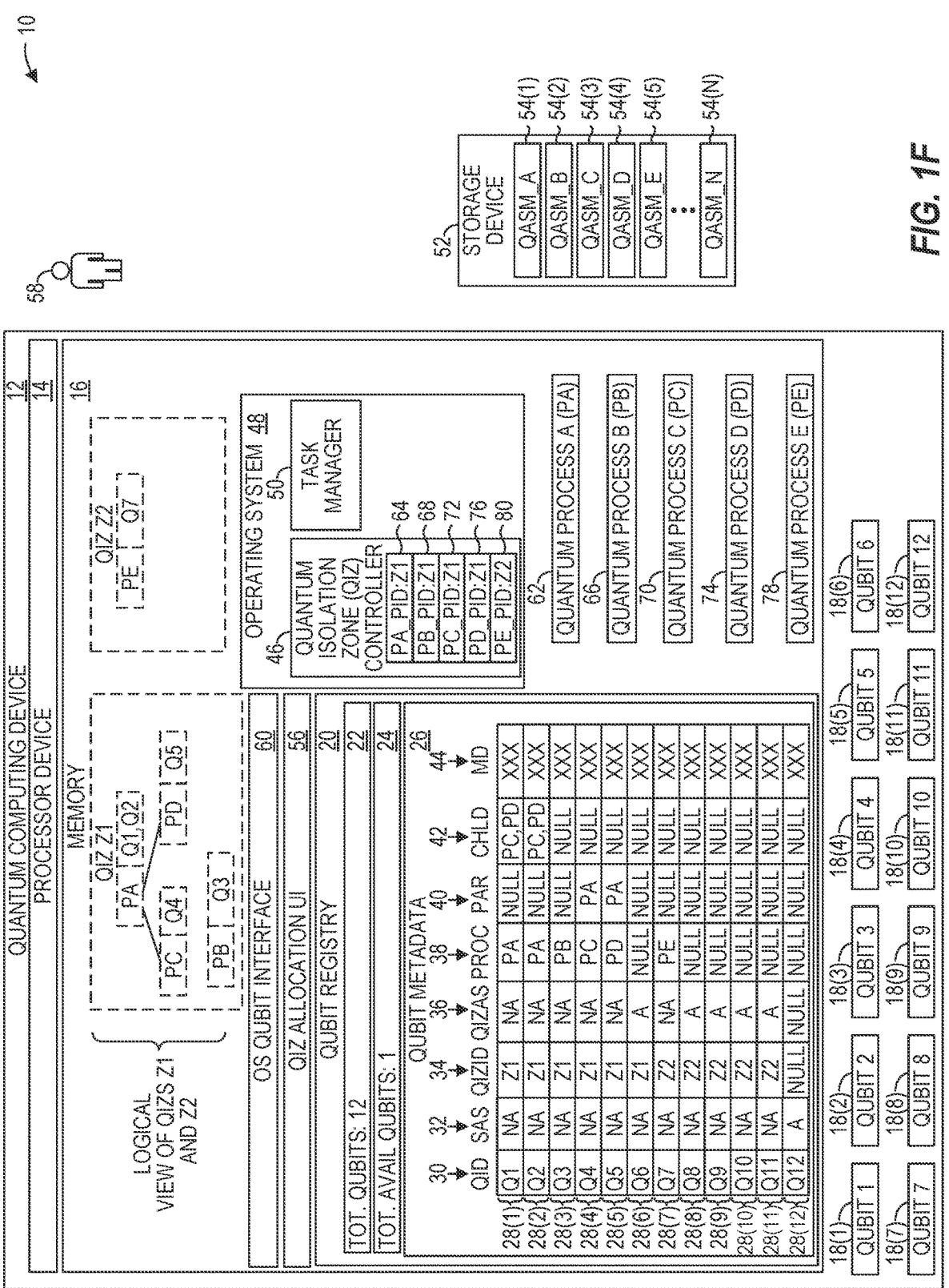

The QIZ controller 46 receives a request, from a requestor, to allocate a second group of qubits 18 from available qubits 18 to establish a second QIZ that limits visibility of any quantum process associated with the second QIZ to only the qubits 18 in the second group of qubits 18. In this example, the request indicates that five (5) qubits 18 are to be allocated to the second QIZ. The QIZ controller 46 accesses the qubit metadata 26 and identifies five (5) qubits 18 that have a system availability status 32 that indicates the qubits 18 are available. In this example, the QIZ controller 46 determines that the five (5) qubits 18(7)-18(11) are available based on the system availability status 32 of the metadata records 28(7)-28(11). Referring now to FIG. 1F, the QIZ controller 46 modifies the system availability status 32 of the metadata records 28(7)-28(11) (e.g., by setting the value to "NA") to indicate that the five (5) qubits 18(7)-18(11) are no longer available for allocation. The QIZ controller 46 obtains a unique QIZ identifier (in this example, "Z2"), and modifies the QIZID 34 of the metadata records 28(7)-28(11) to indicate that the qubits 18(7)-18(11) have been allocated to the QIZ Z2. The QIZ controller 46 modifies the QIZ availability status 36 of the metadata records 28(7)-28(11) (e.g., by setting the value to "A") to indicate that the qubits 18(7)-18(11) are available for allocation within the QIZ Z2. The QIZ controller 46 modifies the total available qubits counter 24 to indicate that one (1) qubit 18 (i.e., qubit 18(12)) is now available for allocation to a QIZ.

Assume further that the task manager 50 receives a request to initiate a quantum process based on the QASM file 54(5) into the QIZ Z2. The task manager 50 may access the QASM file 54(5) and parse the QASM file 54(5) to determine that, during execution, the quantum process initiated from the QASM file 54(5) will utilize one (1) qubit 18. The task manager 50 sends a request to the QIZ controller 46 for an allocation of one (1) qubit 18 from the QIZ Z2. The QIZ controller 46 receives the request to allocate one (1) qubit in the QIZ Z2 to a quantum process that is, or will be, associated with the QIZ Z2. Based on the metadata records 28, the QIZ controller 46 determines that the qubit 18(7) is available for allocation within the QIZ Z2 and modifies the QIZ availability status 36 of the metadata record 28(7) (e.g., by setting the value to "NA") to indicate that the corresponding qubit 18(7) has been allocated and thus is no longer available for allocation.

The QIZ controller 46 provides the qubit ID of the qubit 18(7) to the task manager 50. The task manager 50 initiates a quantum process (captioned as "PE" in FIG. 1F) 78 into the QIZ Z2 with location information of the qubit 18(7). The task manager 50 provides a unique PID of the quantum process 78 (captioned as "PE_PID" in FIG. 1F) to the QIZ controller 46. The QIZ controller 46 generates a mapping record 80 that maps the PID to the QIZ Z2. The quantum process 78 is now said to "execute in" or be "associated with" the QIZ Z2.

Assume that, at the point in time illustrated in FIG. 1F, the quantum process 78 issues a request to the OS qubit interface 60 to obtain a list of qubit IDs of all qubits 18 to which the quantum process 78 has access (i.e., read access and/or write access) or which are available for allocation. The OS qubit interface 60 communicates with the QIZ controller 46. The QIZ controller 46 determines the PID of the requestor, which in this case is the PID PE_PID, the PID of the quantum process 78. The QIZ controller 46 accesses the mapping record 80 and determines that the quantum process 78 is associated with the QIZ Z2. The QIZ controller 46 accesses the metadata records 28 and determines that the qubits 18(7)-18(11) have been allocated to the QIZ Z2, and that the qubits 18(8)-18(11) are available. Because the qubit 18(7) has already been allocated to the quantum process 78 and the four (4) qubits 18(8)-18(11) are available, the QIZ controller 46 returns the qubit IDs of the qubits 18(7)-18(11) to the quantum process 78 via the OS qubit interface 60, indicating that the quantum process 78 has access to the qubit 18(7), and that the qubits 18(8)-18(11) are available for allocation. Thus, from the perspective of the quantum process 78, the quantum computing device 12 contains four (4) available qubits 18, and the quantum process 78 is unaware of and unable to access (e.g., is isolated from) the qubits 18(1)-18(6) and 18(12).

It is noted that because the QIZ controller 46 is a component of the quantum computing device 12, functionality implemented by the QIZ controller 46 may be attributed to the quantum computing device 12 generally. Moreover, in examples where the QIZ controller 46 comprises software instructions that program the processor device 14 to carry out functionality discussed herein, functionality implemented by the QIZ controller 46 may be attributed herein to the processor device 14.

FIG. 2 is a flowchart 82 of a method for implementing QIZs according to one example. FIG. 2 will be discussed in conjunction with FIGS. 1A-1F for the sake of clarity. Operations in FIG. 2 begin with the QIZ controller 46 receiving, from a requestor, a request to allocate a group of the qubits 18 from the plurality of available qubits 18 that are implemented by the quantum computing device 12 and establish the QIZ Z1 that limits qubit visibility of any quantum process associated with the QIZ Z1 to the qubits 18 in the group of qubits 18(block 84). The QIZ controller 46 selects the first group of qubits 18(1)-18(6) from the plurality of available qubits 18(1)-18(12) (block 86). The QIZ controller 46 obtains the QIZID Z1 that uniquely identifies the QIZ Z1 (block 88). The QIZ controller 46 modifies the qubit metadata (e.g., the metadata records 28(1)-28(6) of FIGS. 1A-1F) of the group of qubits 18(1)-18(6) to indicate that each qubit 18 in the group of qubits 18(1)-18(6) is associated with the QIZ Z1 (block 90).

Conventional development of a quantum process may take place within a "container," which is an isolated user-space instance implemented by a container platform (such as Red Hat® OpenShift®) that provides operating-system-level virtualization functionality. A container is defined by a container specification file that may indicate, as non-limiting examples, an application or process to be executed within the container, as well as resource requirements of the application or process and/or resource constraints to be imposed by the container. In the case of quantum processes, a container specification file for the quantum process may specify a process definition file that defines the quantum process, and may further specify an execution requirement of the quantum process (e.g., a processor load tolerance, a number of qubits required by the quantum process, a noise tolerance of the quantum process, or a heat tolerance of the quantum process, as non-limiting examples).

Figure 3A:
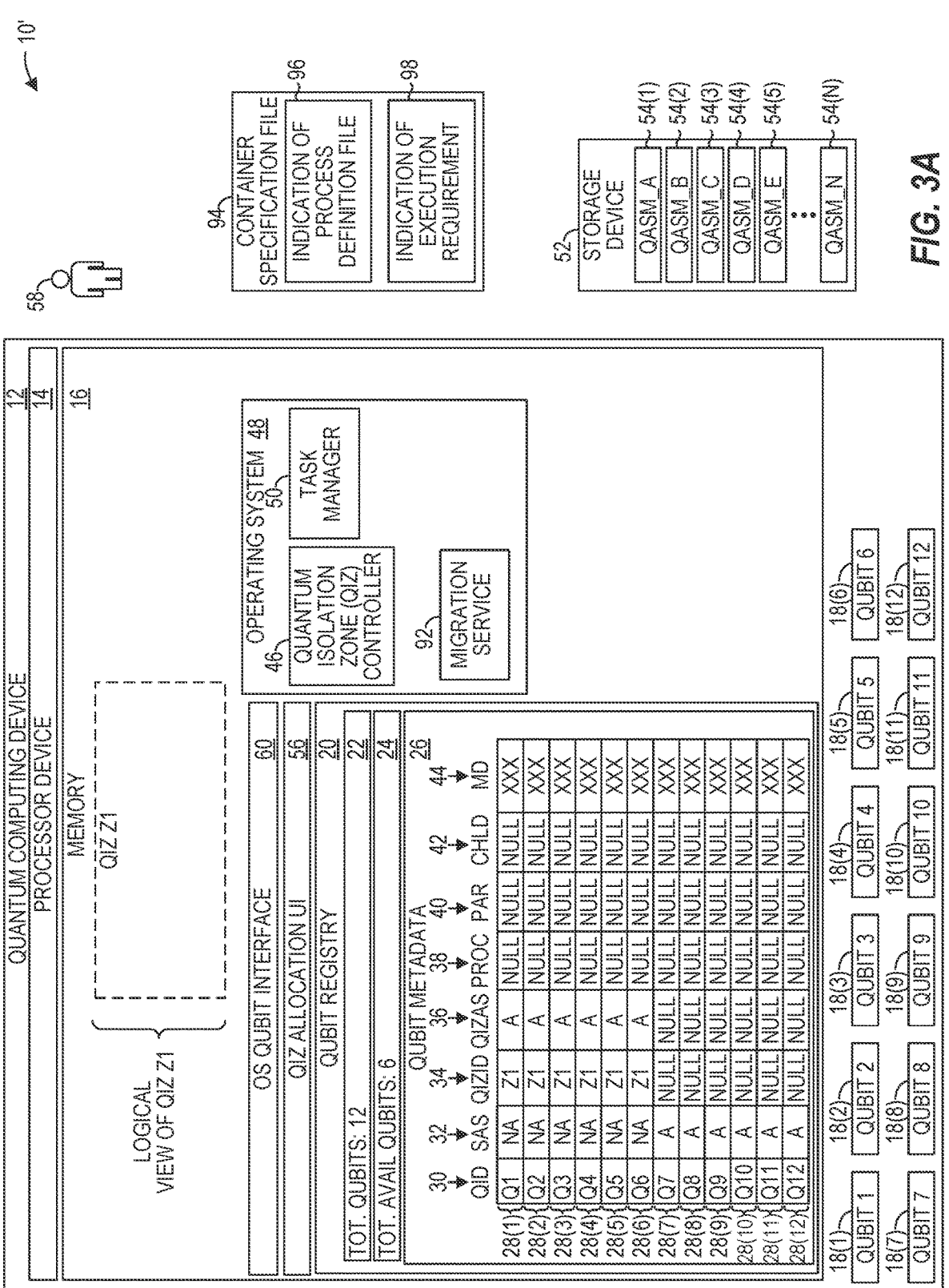
FIGS. 3A-3D are block diagrams of an environment for migrating container-based quantum processes to QIZs according to one example.

To facilitate development of quantum processes, examples disclosed herein provide that the QIZ controller 46 is configured to migrate container-based quantum processes to QIZs. In this regard, FIGS. 3A-3D provide block diagrams of an environment 10', which is substantially similar to the environment 10 except as otherwise noted herein. In the example of FIGS. 3A-3D, the environment 10' is in a state corresponding to that of the environment 10 of FIG. 1B. In particular, the QIZ Z1 has been established, and the qubits 18(1)-18(6) have been allocated to the QIZ Z1. As in FIG. 1B, FIG. 3A illustrates a logical view of the QIZ Z1 in dashed lines to facilitate an understanding of the isolation and relationship aspects of QIZs implemented by the examples herein. However, it should be understood that the QIZ Z1 illustrated in dashed outline is a logical depiction only provided for ease of understanding and that the functionality of the QIZ Z1 is implemented via the QIZ controller 46, the qubit metadata 26, and other components as described herein.

In FIG. 3A, the quantum computing device 12 provides a migration service 92 to manage migration of container-based quantum processes to QIZs. In exemplary operation, the migration service 92 receives a first container specification file 94, which includes a first indication 96 of a process definition file (e.g., the QASM file 54(1)) of a first quantum process, and a first indication 98 of a first execution requirement of the first quantum process. The first container specification file 94 may be received according to a schedule, may be received programmatically, or may be received as input from the operator 58. The migration service 92 determines, based on the first execution requirement, that the QIZ Z1 satisfies the first execution requirement of the first quantum process. For instance, in examples in which the first execution requirement of the first quantum process specifies a processor load tolerance of the first quantum process (i.e., a maximum current processor load under which execution of the first quantum process should take place), the migration service 92 may query the task manager 50 or other element of the operating system 48 to determine that a current processor load experienced by the QIZ Z1 satisfies the processor load tolerance of the first quantum process.

Figure 3B:
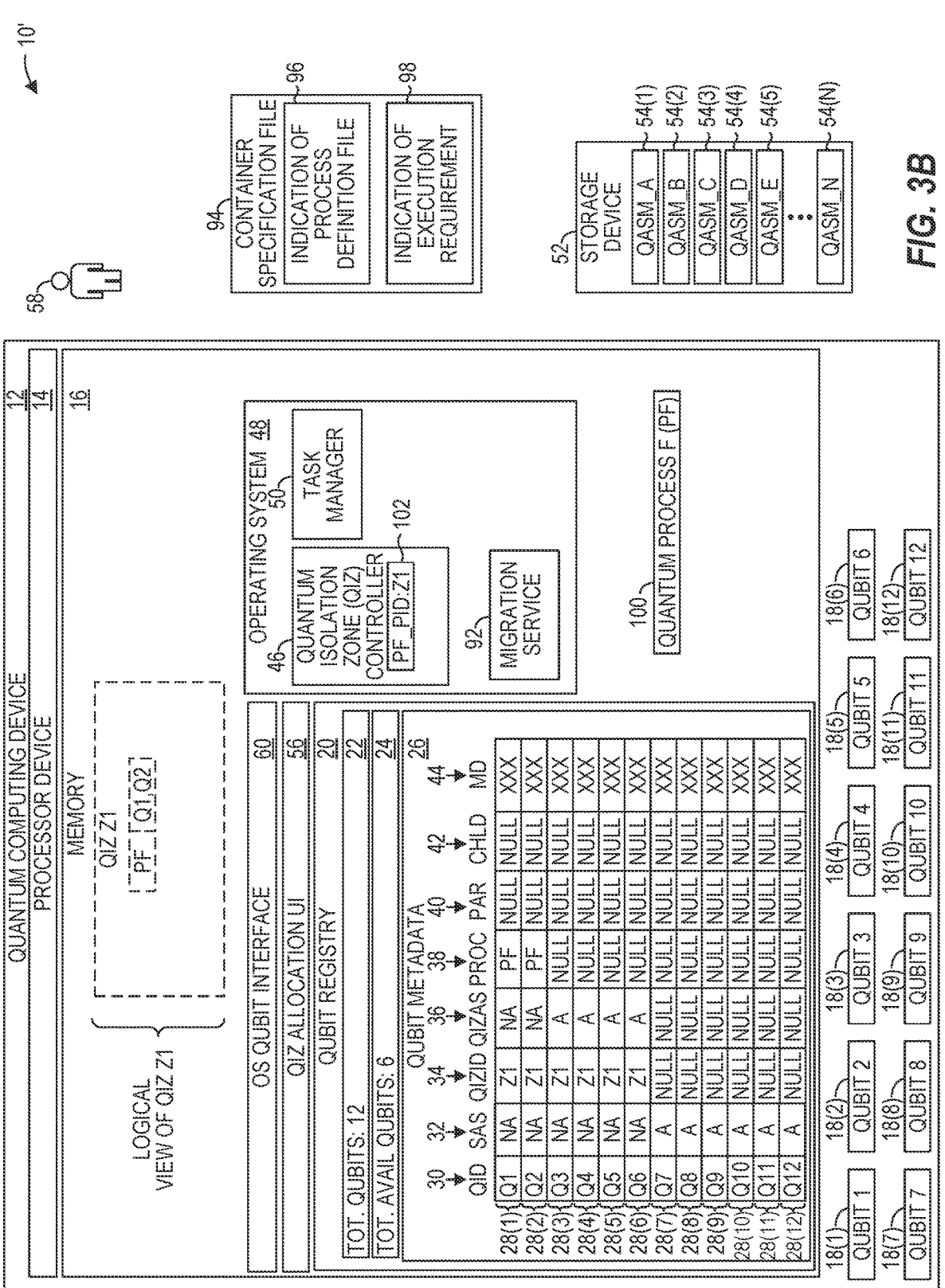

Referring now to FIG. 3B, in response to determining that the QIZ Z1 satisfies the first execution requirement, the migration service 92 allocates a first one or more qubits (e.g., the qubits 18(1) and 18(2)) of the plurality of qubits 18(1)-18(6) associated with the QIZ Z1 to the first quantum process based on the QASM file 54(1). This may be accomplished in some examples by the migration service 92 using the task manager 50 to parse the QASM file 54(1) to determine a first quantity of qubits (two (2), in this example) needed for execution of the QASM file 54(1). The task manager 50 then sends a request to the QIZ controller 46 for an allocation of two (2) qubits 18 from the QIZ Z1. The QIZ controller 46 receives the request to allocate two (2) qubits 18 in the QIZ Z1 to the first quantum process that will be associated with the QIZ Z1. Based on the metadata records 28, the QIZ controller 46 determines that the qubits 18(1) and 18(2) are available for allocation within the QIZ Z1, and modifies the QIZ availability status 36 of the metadata records 28(1) and 28(2) to indicate that the corresponding qubits 18(1) and 18(2) have been allocated to the first quantum process and thus are no longer available for allocation (e.g., "NA").

The migration service 92 then initiates execution of a first quantum process (captioned as "PF" in FIGS. 3B-3D) 100 to utilize the qubits 18(1) and 18(2), based on the QASM file 54(1). Some examples may provide that the migration service 92 performs this operation by using the QIZ controller 46 to provide the qubit IDs of the qubits 18(1) and 18(2) to the task manager 50. The task manager 50 initiates the first quantum process 100 into the QIZ Z1 with location/address information of the qubits 18(1) and 18(2). The task manager 50 provides a unique PID of the first quantum process 100 (captioned as "PF_PID" in FIGS. 3B-3D) to the QIZ controller 46, which maintains a mapping record 102 that maps the PID to the QIZ Z1. The QIZ controller 46 also modifies the process identifier 38 of the metadata records 28(1) and 28(2) to indicate that the qubits 18(1) and 18(2) are allocated to the first quantum process 100. The first quantum process 100 is now said to "execute in" or be "associated with" the QIZ Z1, because the visibility of and access to the qubits 18(1)-18(12) is now constrained by the QIZ Z1.

In some examples, the migration service 92 may subsequently determine that the first quantum process 100 has completed execution (e.g., based on a notification or a query response from the task manager 50). In response, the migration service 92 may deallocate the first one or more qubits (i.e., the qubits 18(1) and 18(2)) associated with the QIZ Z1 by updating or causing the updating of the metadata records 28(1) and 28(2).

Figure 3C:
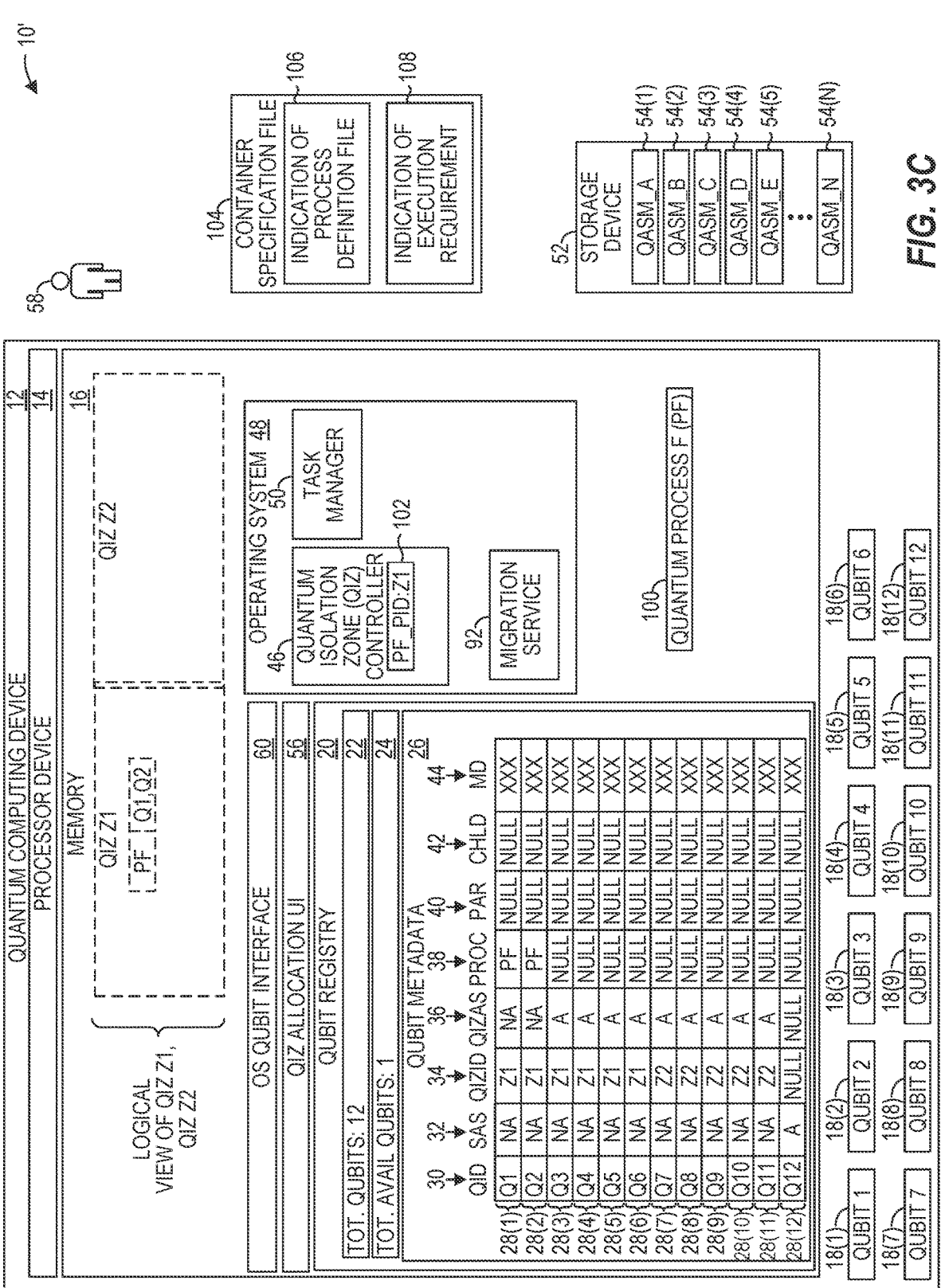

Turning now to FIG. 3C, in some examples, the migration service 92 may receive a second container specification file 104, which includes a second indication 106 of a second process definition file (e.g., the QASM file 54(2)) of a second quantum process, and a second indication 108 of a second execution requirement of the second quantum process. In this example, the migration service 92 determines, based on the second execution requirement, that no QIZ satisfies the second execution requirement of the second quantum process. The migration service 92 thus selects a second one or more qubits 18 of the plurality of available qubits 18 implemented by the quantum computing device 12. For instance, the migration service 92 may send a request to the QIZ controller 46 to allocate a second group of qubits 18 from available qubits 18 to establish a second QIZ that limits visibility of any quantum process associated with the second QIZ to only the qubits 18 in the second group of qubits 18. In this example, the request indicates that five (5) qubits 18 are to be allocated to the second QIZ. The QIZ controller 46 accesses the qubit metadata 26 and identifies five (5) qubits 18 that have a system availability status 32 that indicates the qubits 18 are available. The QIZ controller 46 determines that the five (5) qubits 18(7)-18(11) are available based on the system availability status 32 of the metadata records 28(7)-28(11). The QIZ controller 46 then modifies the system availability status 32 of the metadata records 28(7)-28(11) (e.g., by setting the value to "NA") to indicate that the five (5) qubits 18(7)-18(11) are no longer available for allocation.

The migration service 92 next obtains (e.g., by accessing the QIZ controller 46) a unique QIZ identifier that uniquely identifies a second QIZ (in this example, "Z2"), and then associates the second one or more qubits 18(7)-18(11) with the second QIZ Z2. In some examples, the migration service 92 may accomplish this by requesting that the QIZ controller 46 modify the QIZID 34 of the metadata records 28(7)-28(11) to indicate that the qubits 18(7)-18(11) have been allocated to the QIZ Z2. The QIZ controller 46 also modifies the QIZ availability status 36 of the metadata records 28(7)-28(11) (e.g., by setting the value to "A") to indicate that the qubits 18(7)-18(11) are available for allocation within the QIZ Z2, and modifies the total available qubits counter 24 to indicate that one (1) qubit 18 (i.e., qubit 18(12)) is now available for allocation to a QIZ.

Figure 3D:
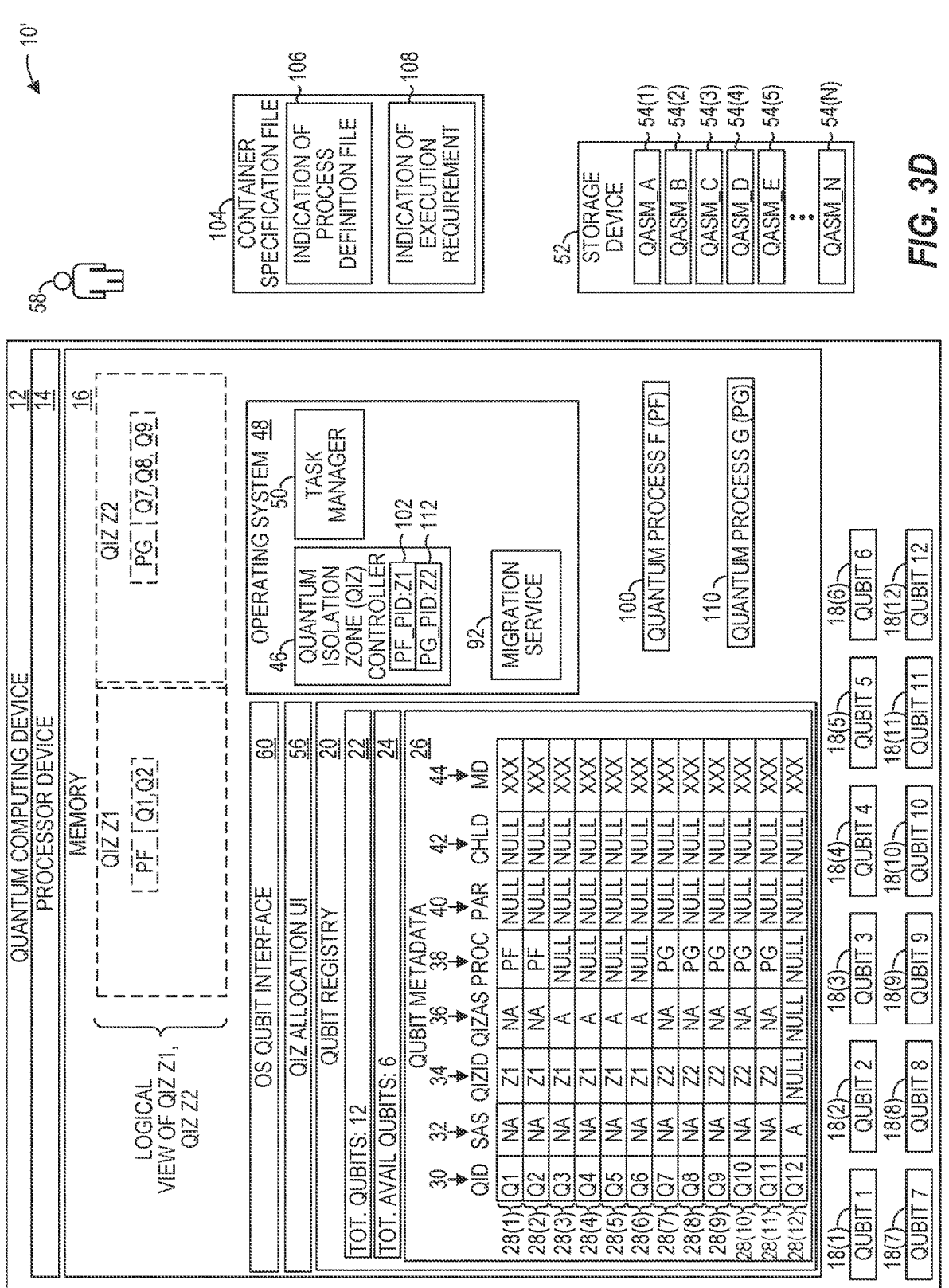

The migration service 92 also allocates some or all of the second one or more qubits 18(7)-18(11) associated with the second QIZ Z2 to the second quantum process, based on the QASM file 54(2). Some examples may provide that the migration service 92 may allocate the second one or more qubits 18(7)-18(11) to the second quantum process by employing the task manager 50 to parse the QASM file 54(2) to determine that, during execution, the quantum process initiated from the QASM file 54(2) will utilize five (5) qubits 18. The task manager 50 sends a request to the QIZ controller 46 for an allocation of five (5) qubits 18 from the QIZ Z2. The QIZ controller 46 receives the request to allocate five (5) qubits in the QIZ Z2 to the second quantum process will be associated with the QIZ Z2. Based on the metadata records 28, the QIZ controller 46 determines that the qubits 18(7)-18(11) are available for allocation within the QIZ Z2, and modifies the QIZ availability status 36 of the metadata records 28(7)-28(11) (e.g., by setting the value to "NA") to indicate that the corresponding qubits 18(7)-18(11) has been allocated and thus is no longer available for allocation, as seen in FIG. 3D.

Finally, the migration service 92 initiates execution of a second quantum process (captioned as "PG" in FIG. 3D) 110 to utilize the second qubits 18(7)-18(11) based on the QASM file 54(2). In some examples, the migration service 92 may cause the QIZ controller 46 to provide the qubit ID of the qubits 18(7)-17 (11) to the task manager 50. The task manager 50 initiates the second quantum process 110 into the QIZ Z2 with location information of the qubits 18(7)-18(11). The task manager 50 provides a unique PID (captioned as "PG_PID" in FIG. 3D) of the second quantum process 110 to the QIZ controller 46. The QIZ controller 46 generates a mapping record 112 that maps the PID to the QIZ Z2. The second quantum process 110 is now said to "execute in" or be "associated with" the QIZ Z2.

It is to be understood that, because the migration service 92 is a component of the quantum computing device 12, functionality implemented by the migration service 92 may be attributed to the quantum computing device 12 generally. Moreover, in examples where the migration service 92 comprises software instructions that program the processor device 14 to carry out functionality discussed herein, functionality implemented by the migration service 92 may be attributed herein to the processor device 14. It is to be further understood that while, for purposes of illustration only, the migration service 92 is depicted as a single component, the functionality implemented by the migration service 92 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

FIGS. 4A-4E provide a flowchart 114 to illustrate exemplary operations performed by the quantum computing device 12 of FIGS. 1A-1F and 3A-3D for migrating container-based quantum processes to QIZs according to one example. Elements of FIGS. 1A-1F and 3A-3D are referenced in describing FIGS. 4A-4E for the sake of clarity. It is to be understood that, in some examples, some operations illustrated in FIGS. 4A-4E may be performed in an order other than illustrated herein, and/or may be omitted.

In FIG. 4A, operations in some examples begin with the processor device 14 of the quantum computing device 12 (e.g., using the migration service 92) receiving a first container specification file (e.g., the container specification file 94 of FIGS. 3A-3B) comprising an indication of a first process definition file of a first quantum process (e.g., the indication 96 of the first process definition file 54(1) of the first quantum process 100 of FIGS. 3A-3B) and an indication of a first execution requirement of the first quantum process 100 (e.g., the indication 98 of FIGS. 3A-3B) (block 116). The migration service 92 determines, based on the first execution requirement, that a first QIZ (e.g., the first QIZ Z1 of FIGS. 3A-3B) provided by the quantum computing device 12 satisfies the first execution requirement of the first quantum process 100, wherein the first QIZ Z1 limits qubit visibility of any quantum process associated with the first QIZ Z1 to a plurality of qubits (e.g., the qubits 18(1)-18(6) of FIGS. 3A-3B) associated with the first QIZ Z1 (block 118). Operations then continue at block 120 of FIG. 4B.

Turning now to FIG. 4B, the migration service 92 performs a series of operations responsive to determining that the first QIZ Z1 satisfies the first execution requirement (block 120). The migration service 92 allocates a first one or more qubits (e.g., the qubits 18(1) and 18(2) of FIGS. 3A-3B) of the plurality of qubits 18(1)-18(6) associated with the first QIZ Z1 to the first quantum process 100 based on the first process definition file 54(1) (block 122). In some examples, the operations of block 122 for allocating the first one or more qubits 18(1) and 18(2) may comprise the migration service 92 first parsing the first process definition file 54(1) to determine a first quantity of qubits needed for execution of the first process definition file 54(1) (block 124). Based on the first quantity of qubits, the migration service 92 modifies qubit metadata, such as the metadata records 28(1) and 28(2) of FIGS. 3A-3B, of the first one or more qubits 18(1) and 18(2) to indicate that each qubit in the first one or more qubits 18(1) and 18(2) is allocated to the first quantum process 100 (block 126). The migration service 92 then initiates execution of the first quantum process 100 to utilize the first one or more qubits 18(1) and 18(2), based on the first process definition file 54(1) (block 128). Some examples may provide that operations continue at block 130 of FIG. 4C.

With reference now to FIG. 4C, the migration service 92 according to some examples may determine that the first quantum process 100 has completed execution (block 130). In response, the migration service 92 deallocates the first one or more qubits 18(1) and 18(2) of the plurality of qubits 18(1)-18(6) associated with the first QIZ Z1 (block 132). The operations of block 132 for deallocating the first one or more qubits 18(1) and 18(2) may comprise modifying the metadata records 28(1) and 28(2) to indicate that each qubit in the one or more qubits 18(1) and 18(2) is no longer allocated to the first quantum process 100.

Some examples may provide that the migration service 92 may receive a second container specification file (e.g., the container specification file 104 of FIGS. 3C-3D) that comprises an indication of a second process definition file of a second quantum process 110 (e.g., the indication 106 of the second process definition file 54(2) of the second quantum process 110 of FIGS. 3C-3D) and an indication of a second execution requirement of the second quantum process 110 (e.g., the indication 108 of FIGS. 3C-3D) (block 134). The migration service 92 determines, based on the second execution requirement, that no QIZ provided by the quantum computing device 12 satisfies the second execution requirement of the second quantum process 110 (block 136). Operations in such examples may continue at block 138 of FIG. 4D.

Figure 4D:
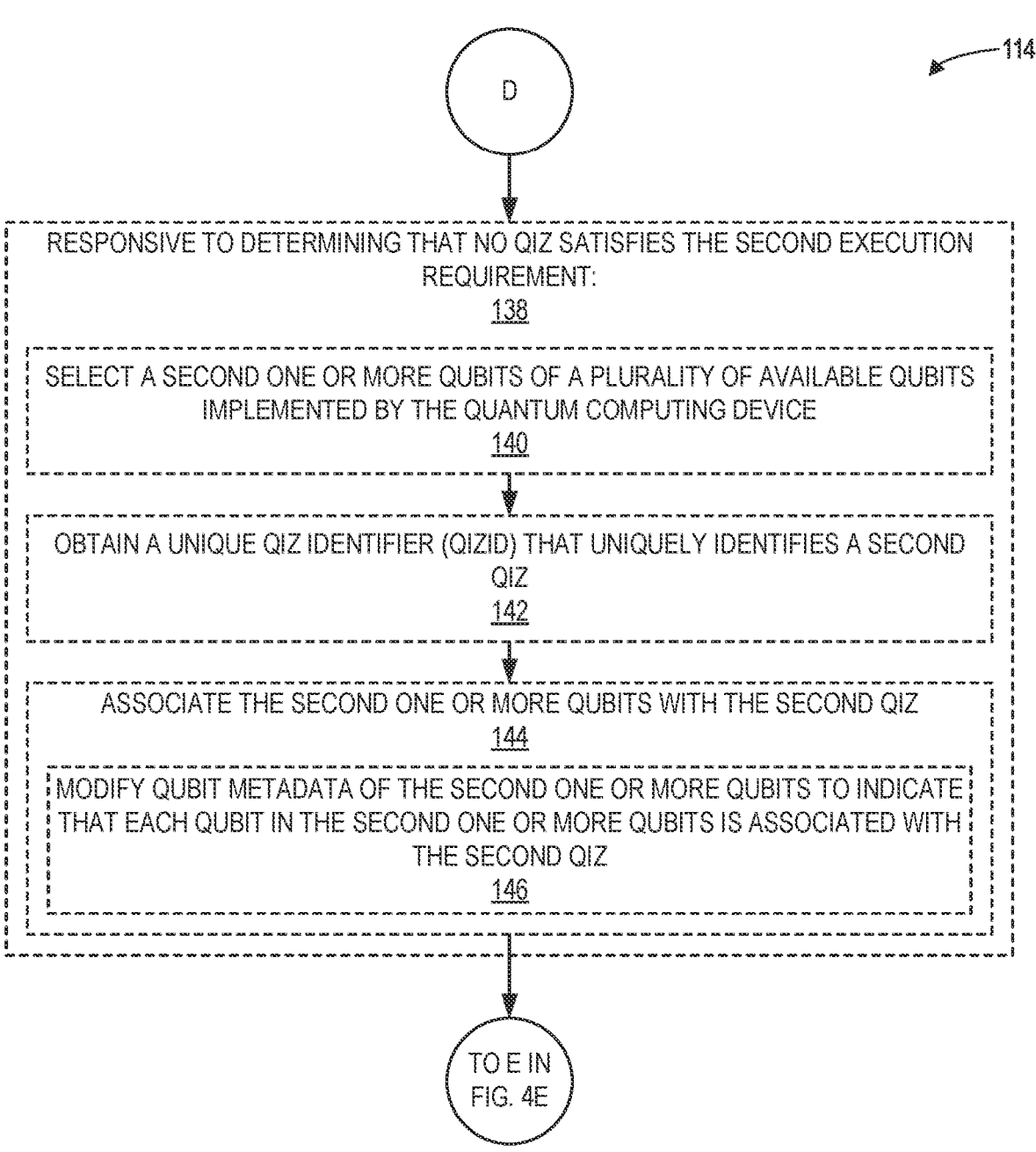

Referring now to FIG. 4D, the migration service 92 performs a series of operations responsive to determining that no QIZ satisfies the second execution requirement (block 138). The migration service 92 selects a second one or more qubits of a plurality of available qubits implemented by the quantum computing device 12 (e.g., the qubits 18(7)-18(11) of the plurality of available qubits 18(1)-18(12) of FIGS. 3C-3D) (block 140). The migration service 92 obtains a unique QIZID that uniquely identifies a second QIZ (e.g., the QIZ Z2 of FIGS. 3C-3D) (block 142).

The migration service 92 then associates the second one or more qubits 18(7)-18(11) with the second QIZ Z2 (block 144). In some examples, the operations of block 144 for associating the second one or more qubits 18(7)-18(11) with the second QIZ Z2 may comprise modifying qubit metadata, such as the metadata records 28(7)-28(11) of FIGS. 3C-3D, of the second one or more qubits 18(7)-18(11) to indicate that each qubit in the second one or more qubits 18(7)-18(11) is associated with the second QIZ Z2 (block 146). Operations then continue at block 148 of FIG. 4E.

Figure 4E:
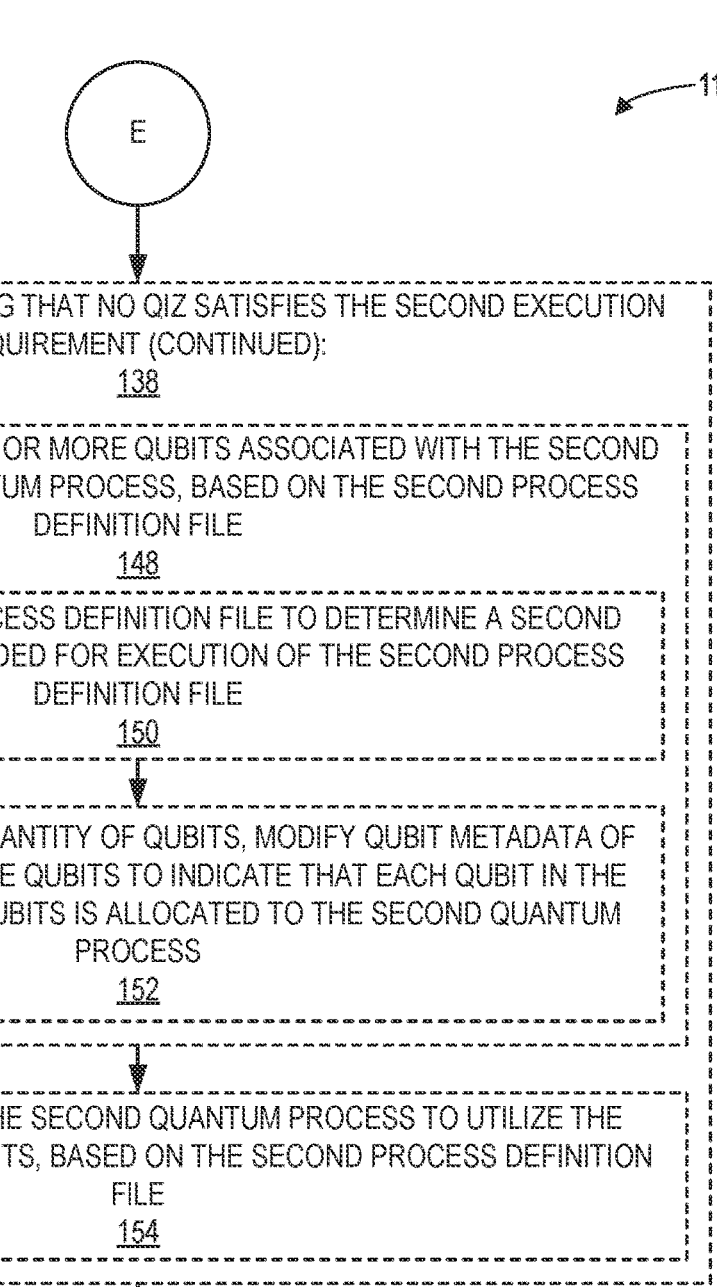

Turning now to FIG. 4E, the migration service 92 next allocates the second one or more qubits 18(7)-18(11) associated with the second QIZ Z2 to the second quantum process 110, based on the second process definition file 54(2) (block 148). Some examples may provide that the operations of block 148 for allocating the second one or more qubits 18(7)-18(11) comprise parsing the second process definition file 54(2) to determine a second quantity of qubits needed for execution of the second process definition file 54(2) (block 150). Based on the second quantity of qubits, the migration service 92 modifies the metadata records 28(7)-28(11) of the second one or more qubits 18(7)-18(11) to indicate that each qubit in the second one or more qubits 18(7)-18(11) is allocated to the second quantum process 110 (block 152). The migration service 92 then initiates execution of the second quantum process 110 to utilize the second one or more qubits 18(7)-18(11), based on the second process definition file 54(2) (block 154).

Figure 5:
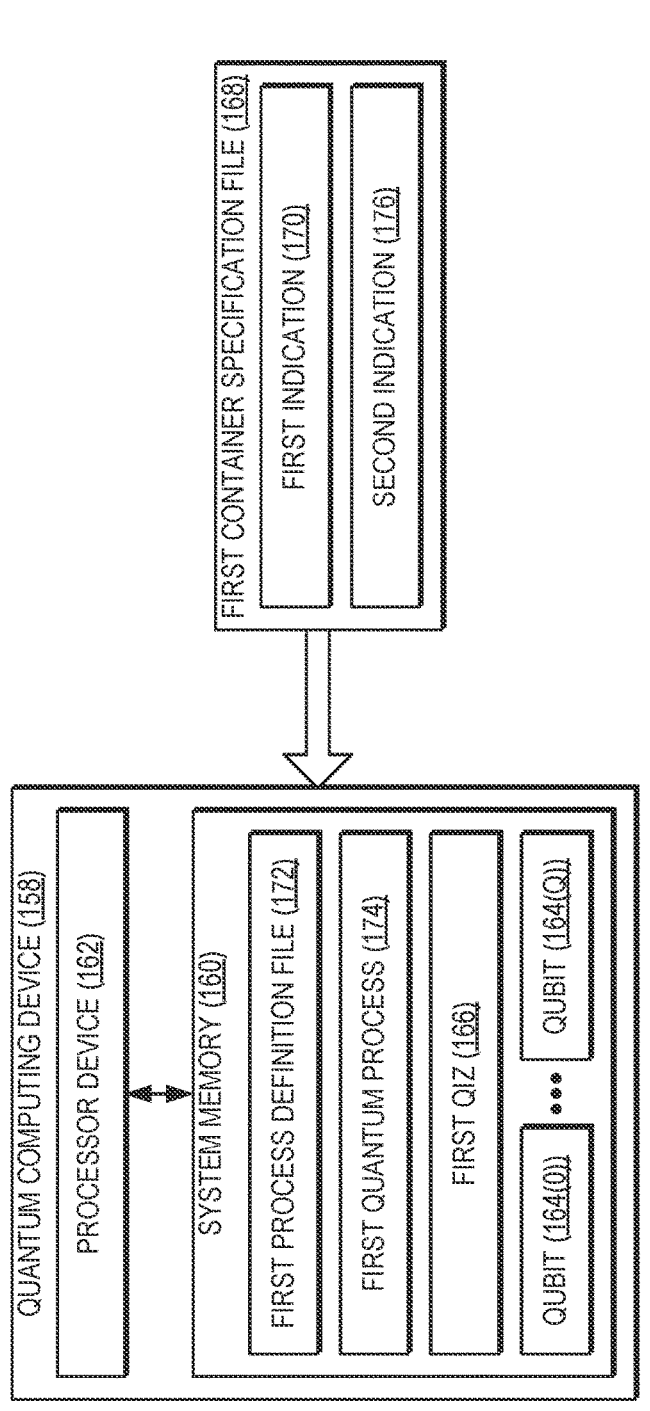
FIG. 5 is a simpler block diagram of the quantum computing system of FIGS. 3A-3D for migrating container-based quantum processes to QIZs, according to one example.

FIG. 5 is a simpler block diagram of the environment 10' of FIGS. 3A-3D for migrating container-based quantum processes to QIZs, according to one example. In the example of FIG. 5, a quantum computing system 156 includes a quantum computing device 158 that comprises a system memory 160 and a processor device 162. The quantum computing device 158 implements a plurality of qubits 164(0)-164(Q) that are associated with a first QIZ 166. In exemplary operation, the processor device 162 of the quantum computing device 158 receives a first container specification file 168 that comprises an indication 170 of a first process definition file 172 of a first quantum process 174, and an indication 176 of a first execution requirement of the first quantum process 174. The processor device 162 determines, based on the first execution requirement, that the first QIZ 166 provided by the quantum computing device 158 satisfies the first execution requirement of the first quantum process 174, wherein the first QIZ 166 limits qubit visibility of any quantum process associated with the first QIZ 166 to a plurality of qubits 164(0)-164(Q) associated with the first QIZ 166. Responsive to determining that the first QIZ 166 satisfies the first execution requirement, the processor device 162 allocate a first one or more qubits 164(0) of the plurality of qubits 164(0)-164(Q) associated with the first QIZ 166 to the first quantum process 174 based on the first process definition file 172. The processor device 162 then initiates execution of the first quantum process 174 to utilize the first one or more qubits 164(0), based on the first process definition file 172.

To illustrate a simplified method for migrating container-based quantum processes to QIZs in the quantum computing system 156 of FIG. 5 according to one example, FIG. 6 provides a flowchart 178. Elements of FIG. 5 are referenced in describing FIG. 6 for the sake of clarity. In FIG. 6, operations begin with the processor device 162 of the quantum computing device 158 receiving the first container specification file 168 comprising the indication 170 of the first process definition file 172 of the first quantum process 174, and the indication 176 of the first execution requirement of the first quantum process 174 (block 180). The processor device 162 next determines, based on the first execution requirement, that the first QIZ 166 provided by the quantum computing device 158 satisfies the first execution requirement of the first quantum process 174, wherein the first QIZ 166 limits qubit visibility of any quantum process associated with the first QIZ 166 to the plurality of qubits 164(0)-164(Q) associated with the first QIZ 166 (block 182). The processor device 162 performs a series of operations responsive to determining that the first QIZ 166 satisfies the first execution requirement (block 184). The processor device 162 allocates the first one or more qubits 164(0) of the plurality of qubits 164(0)-164(Q) associated with the first QIZ 166 to the first quantum process 174 based on the first process definition file 172 (block 186). The processor device 162 then initiates execution of the first quantum process 174 to utilize the first one or more qubits 164(0), based on the first process definition file 172 (block 188).

Figure 7:
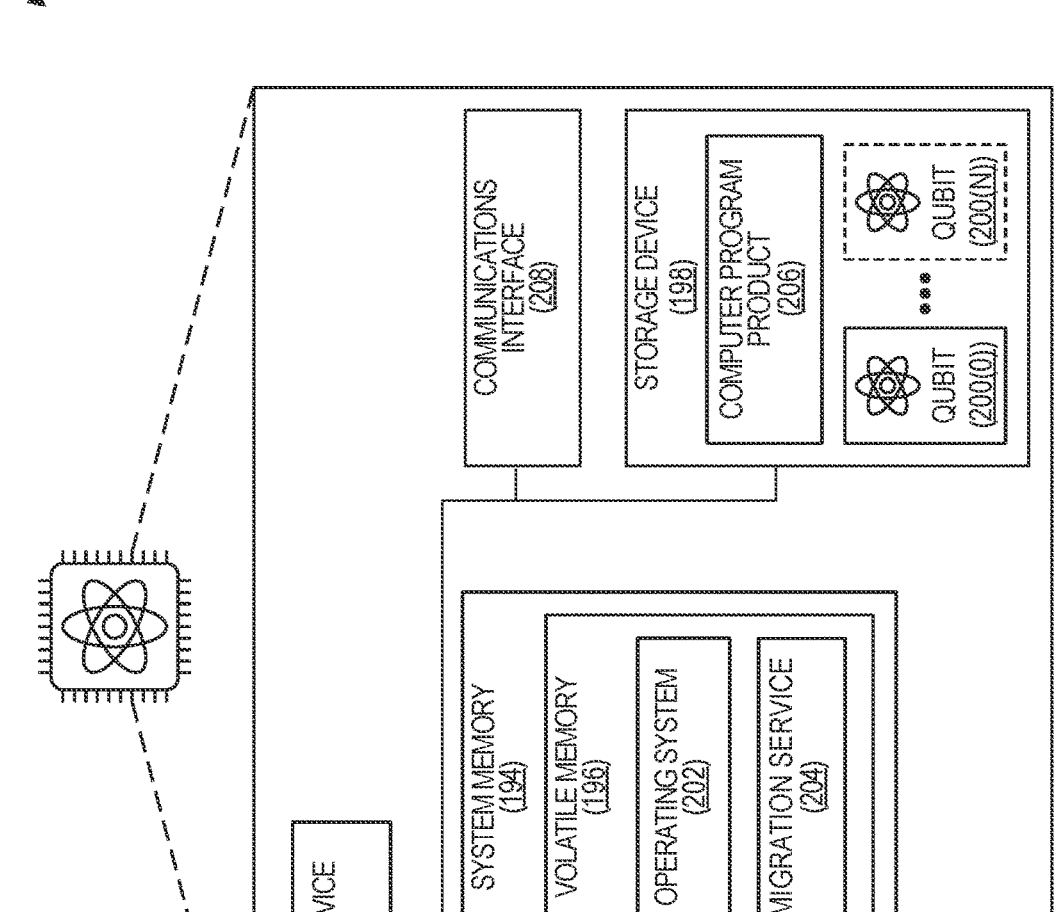
FIG. 7 is a block diagram of a quantum computing device suitable for implementing examples.

FIG. 7 is a block diagram of a quantum computing device 190, such as the quantum computing device 12 of FIG. 1, suitable for implementing examples according to one example. The quantum computing device 190 may comprise any suitable quantum computing device or devices. The quantum computing device 190 can operate using classical computing principles or quantum computing principles. When using quantum computing principles, the quantum computing device 190 performs computations that utilize quantum-mechanical phenomena, such as superposition and entanglement. The quantum computing device 190 may operate under certain environmental conditions, such as at or near zero degrees (0°) Kelvin. When using classical computing principles, the quantum computing device 190 utilizes binary digits that have a value of either zero (0) or one (1).

The quantum computing device 190 includes a processor device 192 and a system memory 194. The processor device 192 can be any commercially available or proprietary processor suitable for operating in a quantum environment. The system memory 194 may include volatile memory 196 (e.g., random-access memory (RAM)). The quantum computing device 190 may further include or be coupled to a non-transitory computer-readable medium such as a storage device 198. The storage device 198 and other drives associated with computer-readable media and computer-usable media may provide non-volatile storage of data, data structures, computer-executable instructions, and the like. The storage device may also provide functionality for storing one or more qubits 200(0)-200(N).

A number of modules can be stored in the storage device 198 and in the volatile memory 196, including an operating system 202 and one or more modules, such as a migration service 204. All or a portion of the examples may be implemented as a computer program product 206 stored on a transitory or non-transitory computer-usable or computer-readable medium, such as the storage device 198, which includes complex programming instructions, such as complex computer-readable program code, to cause the processor device 192 to carry out the steps described herein. Thus, the computer-readable program code can comprise computer-executable instructions for implementing the functionality of the examples described herein when executed on the processor device 192.

An operator may also be able to enter one or more configuration commands through a keyboard (not illustrated), a pointing device such as a mouse (not illustrated), or a touch-sensitive surface such as a display device (not illustrated). The quantum computing device 190 may also include a communications interface 208 suitable for communicating with other quantum computing systems, including, in some examples, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a quantum computing device, a first container specification file comprising:

an indication of a first process definition file of a first quantum process; and an indication of a first execution requirement of the first quantum process;

determining, based on the first execution requirement, that a first quantum isolation zone (QIZ) provided by the quantum computing device satisfies the first execution requirement of the first quantum process, wherein the first QIZ limits qubit visibility of any quantum process associated with the first QIZ to a plurality of qubits associated with the first QIZ; and responsive to determining that the first QIZ satisfies the first execution requirement:

allocating a first one or more qubits of the plurality of qubits associated with the first QIZ to the first quantum process based on the first process definition file; and initiating execution of the first quantum process to utilize the first one or more qubits, based on the first process definition file.

2. The method of claim 1, wherein the first process definition file comprises a quantum assembly language (QASM) file.

3. The method of claim 1, wherein the indication of the first execution requirement comprises an indication of a processor load tolerance of the first quantum process, an indication of a number of qubits required by the first quantum process, an indication of a noise tolerance of the first quantum process, or an indication of a heat tolerance of the first quantum process.

4. The method of claim 1, wherein allocating the first one or more qubits of the plurality of qubits associated with the first QIZ to the first quantum process based on the first process definition file comprises:

parsing the first process definition file to determine a first quantity of qubits needed for execution of the first process definition file; and based on the first quantity of qubits, modifying qubit metadata of the first one or more qubits to indicate that each qubit in the first one or more qubits is allocated to the first quantum process.

5. The method of claim 1, further comprising:

determining that the first quantum process has completed execution; and responsive to determining that the first quantum process has completed execution, deallocating the first one or more qubits of the plurality of qubits associated with the first QIZ.

6. The method of claim 1, further comprising:

receiving a second container specification file comprising:

an indication of a second process definition file of a second quantum process; and an indication of a second execution requirement of the second quantum process;

determining, based on the second execution requirement, that no QIZ provided by the quantum computing device satisfies the second execution requirement of the second quantum process; and responsive to determining that no QIZ satisfies the second execution requirement:

selecting a second one or more qubits of a plurality of available qubits implemented by the quantum computing device;

obtaining a unique QIZ identifier (QIZID) that uniquely identifies a second QIZ;

associating the second one or more qubits with the second QIZ;

allocating the second one or more qubits associated with the second QIZ to the second quantum process, based on the second process definition file; and initiating execution of the second quantum process to utilize the second one or more qubits, based on the second process definition file.

7. The method of claim 6, wherein associating the second one or more qubits with the second QIZ comprises modifying qubit metadata of the second one or more qubits to indicate that each qubit in the second one or more qubits is associated with the second QIZ.

8. The method of claim 6, wherein allocating the second one or more qubits of the plurality of available qubits associated with the second QIZ to the second quantum process based on the second process definition file comprises:

parsing the second process definition file to determine a second quantity of qubits needed for execution of the second process definition file; and based on the second quantity of qubits, modifying qubit metadata of the second one or more qubits to indicate that each qubit in the second one or more qubits is allocated to the second quantum process.

9. A quantum computing device comprising:

a system memory; and a processor device communicatively coupled to the system memory, the processor device to:

receive a first container specification file comprising:

an indication of a first process definition file of a first quantum process; and an indication of a first execution requirement of the first quantum process;

determine, based on the first execution requirement, that a first quantum isolation zone (QIZ) provided by the quantum computing device satisfies the first execution requirement of the first quantum process, wherein the first QIZ limits qubit visibility of any quantum process associated with the first QIZ to a plurality of qubits associated with the first QIZ; and responsive to determining that the first QIZ satisfies the first execution requirement:

allocate a first one or more qubits of the plurality of qubits associated with the first QIZ to the first quantum process based on the first process definition file; and initiate execution of the first quantum process to utilize the first one or more qubits, based on the first process definition file.

10. The quantum computing device of claim 9, wherein the first process definition file comprises a quantum assembly language (QASM) file.

11. The quantum computing device of claim 9, wherein the indication of the first execution requirement comprises an indication of a processor load tolerance of the first quantum process, an indication of a number of qubits required by the first quantum process, an indication of a noise tolerance of the first quantum process, or an indication of a heat tolerance of the first quantum process.

12. The quantum computing device of claim 9, wherein to allocate the first one or more qubits of the plurality of qubits associated with the first QIZ to the first quantum process based on the first process definition file is to:

parse the first process definition file to determine a first quantity of qubits needed for execution of the first process definition file; and based on the first quantity of qubits, modify qubit metadata of the first one or more qubits to indicate that each qubit in the first one or more qubits is allocated to the first quantum process.

13. The quantum computing device of claim 9, wherein the processor device is further to:

determine that the first quantum process has completed execution; and responsive to determining that the first quantum process has completed execution, deallocate the first one or more qubits of the plurality of qubits associated with the first QIZ.

14. The quantum computing device of claim 9, wherein the processor device is further to:

receive a second container specification file comprising:

an indication of a second process definition file of a second quantum process; and an indication of a second execution requirement of the second quantum process;

determine, based on the second execution requirement, that no QIZ provided by the quantum computing device satisfies the second execution requirement of the second quantum process; and responsive to determining that no QIZ satisfies the second execution requirement:

select a second one or more qubits of a plurality of available qubits implemented by the quantum computing device;

obtain a unique QIZ identifier (QIZID) that uniquely identifies a second QIZ;

associate the second one or more qubits with the second QIZ;

allocate the second one or more qubits associated with the second QIZ to the second quantum process, based on the second process definition file; and initiate execution of the second quantum process to utilize the second one or more qubits, based on the second process definition file.

15. The quantum computing device of claim 14, wherein to associate the second one or more qubits with the second QIZ is to modify qubit metadata of the second one or more qubits to indicate that each qubit in the second one or more qubits is associated with the second QIZ.

16. The quantum computing device of claim 14, wherein to allocate the second one or more qubits of the plurality of available qubits associated with the second QIZ to the second quantum process based on the second process definition file is to:

parse the second process definition file to determine a second quantity of qubits needed for execution of the second process definition file; and based on the second quantity of qubits, modify qubit metadata of the second one or more qubits to indicate that each qubit in the second one or more qubits is allocated to the second quantum process.

17. A non-transitory computer-readable medium having stored thereon computer-executable instructions that, when executed, cause one or more processor devices to:

receive a first container specification file comprising:

an indication of a first process definition file of a first quantum process; and an indication of a first execution requirement of the first quantum process;

determine, based on the first execution requirement, that a first quantum isolation zone (QIZ) provided by a quantum computing device satisfies the first execution requirement of the first quantum process, wherein the first QIZ limits qubit visibility of any quantum process associated with the first QIZ to a plurality of qubits associated with the first QIZ; and responsive to determining that the first QIZ satisfies the first execution requirement:

allocate a first one or more qubits of the plurality of qubits associated with the first QIZ to the first quantum process based on the first process definition file; and initiate execution of the first quantum process to utilize the first one or more qubits, based on the first process definition file.

18. The non-transitory computer-readable medium of claim 17, wherein to allocate the first one or more qubits of the plurality of qubits associated with the first QIZ to the first quantum process based on the first process definition file is to:

parse the first process definition file to determine a first quantity of qubits needed for execution of the first process definition file; and based on the first quantity of qubits, modify qubit metadata of the first one or more qubits to indicate that each qubit in the first one or more qubits is allocated to the first quantum process.

19. The non-transitory computer-readable medium of claim 17, wherein the computer-executable instructions further cause the one or more processor devices to:

determine that the first quantum process has completed execution; and responsive to determining that the first quantum process has completed execution, deallocate the first one or more qubits of the plurality of qubits associated with the first QIZ.

20. The non-transitory computer-readable medium of claim 17, wherein the computer-executable instructions further cause the one or more processor devices to:

receive a second container specification file comprising:

an indication of a second process definition file of a second quantum process; and an indication of a second execution requirement of the second quantum process;

determine, based on the second execution requirement, that no QIZ provided by the quantum computing device satisfies the second execution requirement of the second quantum process; and responsive to determining that no QIZ satisfies the second execution requirement:

select a second one or more qubits of a plurality of available qubits implemented by the quantum computing device;

obtain a unique QIZ identifier (QIZID) that uniquely identifies a second QIZ;

associate the second one or more qubits with the second QIZ;

allocate the second one or more qubits associated with the second QIZ to the second quantum process, based on the second process definition file; and initiate execution of the second quantum process to utilize the second one or more qubits, based on the second process definition file.

* * * * *